United States Patent [19]

Filmer

[11] Patent Number: 5,019,910

[45] Date of Patent: May 28, 1991

[54] APPARATUS FOR ADAPTING COMPUTER FOR SATELLITE COMMUNICATIONS

[75] Inventor: Donald D. Filmer, Coquitlam, Canada

[73] Assignee: Norsat International Inc., Surrey, Canada

[21] Appl. No.: 243,598

[22] Filed: Sep. 12, 1988

Related U.S. Application Data

[63] Continuation-in-part of Ser. No. 8,306, Jan. 29, 1987, abandoned.

[51] Int. Cl.⁵ .................... H04N 5/44; H04B 7/185
[52] U.S. Cl. .................... 358/188; 358/193.1; 358/195.1; 455/12; 455/185; 455/186
[58] Field of Search ................ 358/188, 185, 83, 143, 358/149, 903, 194.1, 191.1, 195.1; 455/12, 13, 179, 182, 183, 185, 186, 158

[56] References Cited

U.S. PATENT DOCUMENTS

| | | | |
|---|---|---|---|
| 3,931,623 | 1/1976 | Sones et al. | 455/12 |
| 3,939,427 | 2/1976 | Mueller | 358/195.1 |
| 3,986,120 | 10/1976 | Edström et al. | 455/12 |
| 4,109,202 | 8/1978 | Kudsia et al. | 455/12 |
| 4,273,962 | 6/1981 | Wolfe | 455/12 |
| 4,317,225 | 2/1982 | Henderson | 455/158 |
| 4,322,751 | 3/1982 | Hongu | 358/195.1 |
| 4,337,480 | 6/1982 | Bourassin et al. | 358/93 |
| 4,360,827 | 12/1982 | Braun | 358/85 |
| 4,422,096 | 12/1983 | Henderson | 358/195.1 |
| 4,424,417 | 1/1984 | Chavey et al. | 455/12 |
| 4,430,669 | 2/1984 | Cheung | 358/193.1 |
| 4,450,481 | 5/1984 | Dickinson | 358/114 |
| 4,538,175 | 8/1985 | Balbes et al. | 358/86 |
| 4,581,643 | 4/1986 | Carlson | 358/195.1 |
| 4,607,257 | 8/1986 | Noguchi | 455/12 |
| 4,625,235 | 11/1986 | Watson | 358/86 |
| 4,763,195 | 8/1988 | Tults | 358/193.1 |

OTHER PUBLICATIONS

Image Processing with the IBM PC, Electronic Imaging, Oct. 1984, pp. 10-5-10-10.

Advertising Leaflet and User's Manual for "PC-SAT RX-3", Satellite Receiver/Data Demodulator; ISS Engineering Inc. 17 Mar. 1988.

Primary Examiner—Tommy P. Chin

[57] ABSTRACT

Computer controllable apparatus for receiving and demodulating a satellite broadcast signal. A programmable radio frequency tuner/demodulator demodulates the broadcast signal to produce a baseband output signal. A video demodulator then demodulates the baseband output signal to produce a video output signal. First and second programmable audio frequency tuner/demodulators further demodulate the baseband output signal to produce first and second audio output signals. A data demodulator further demodulates the second audio output signal to produce a data output signal.

6 Claims, 16 Drawing Sheets

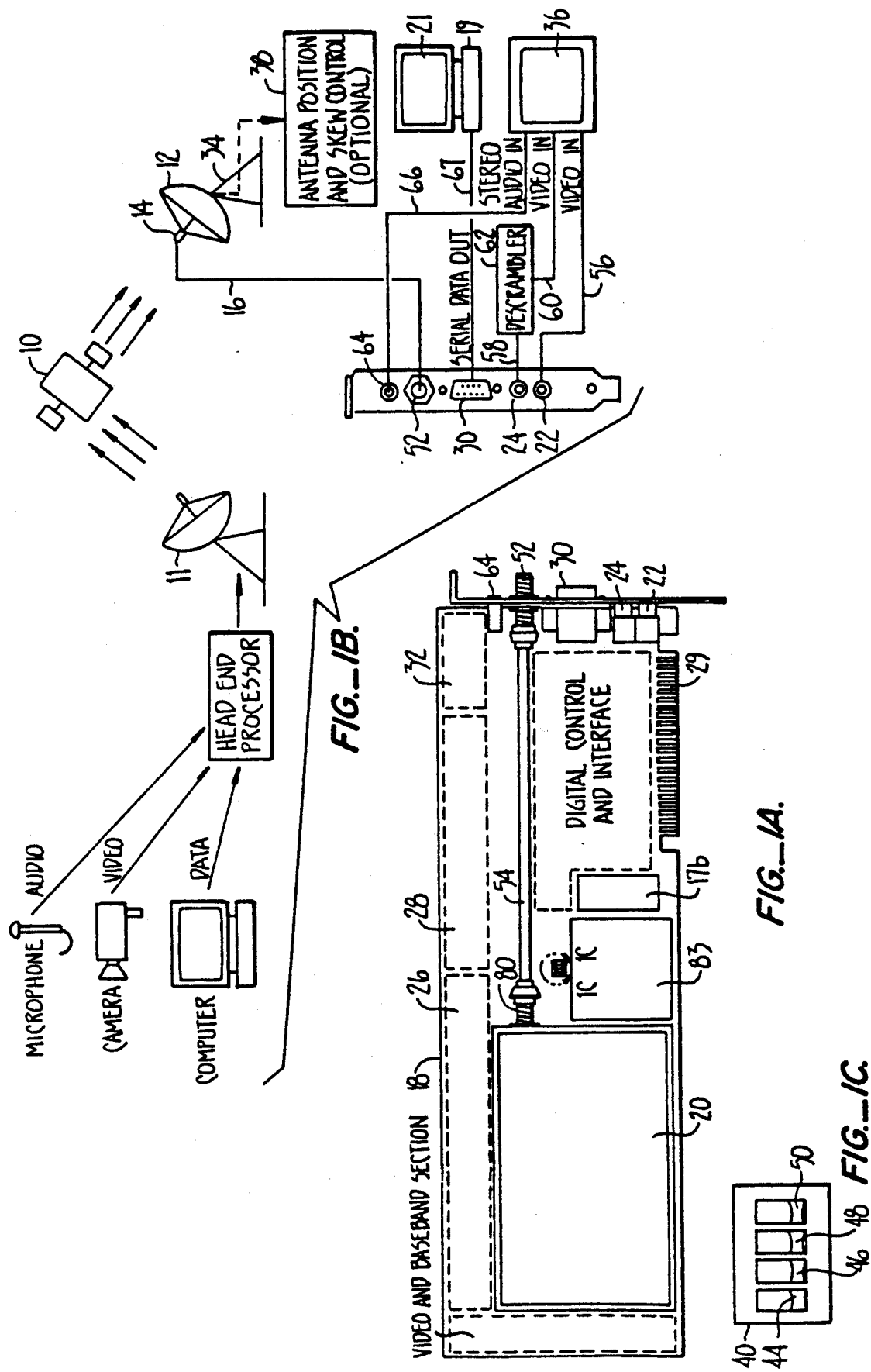

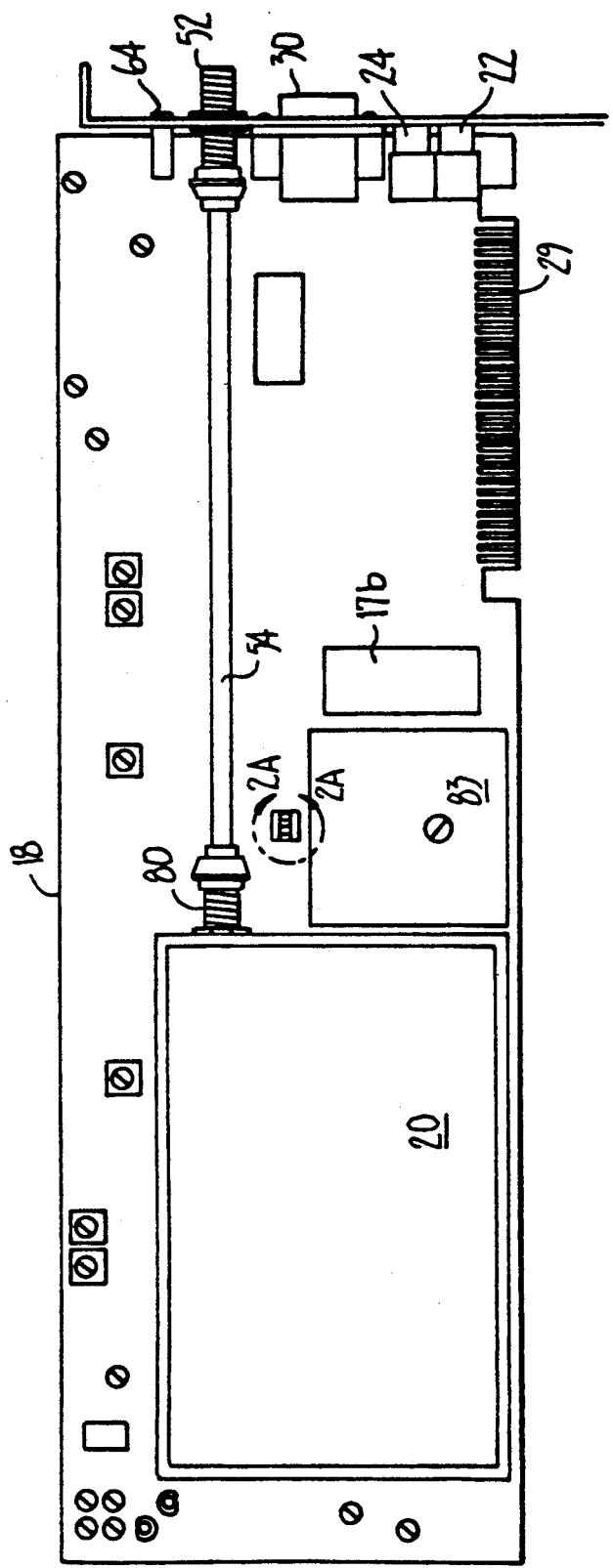

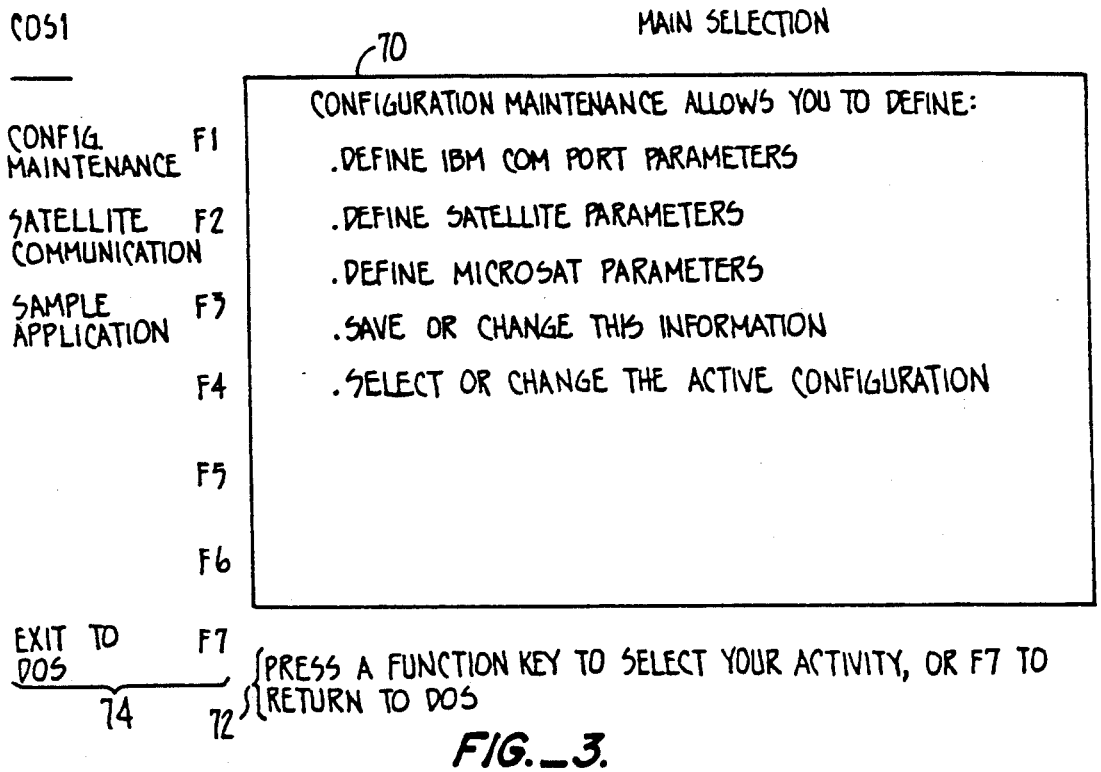
FIG._3.
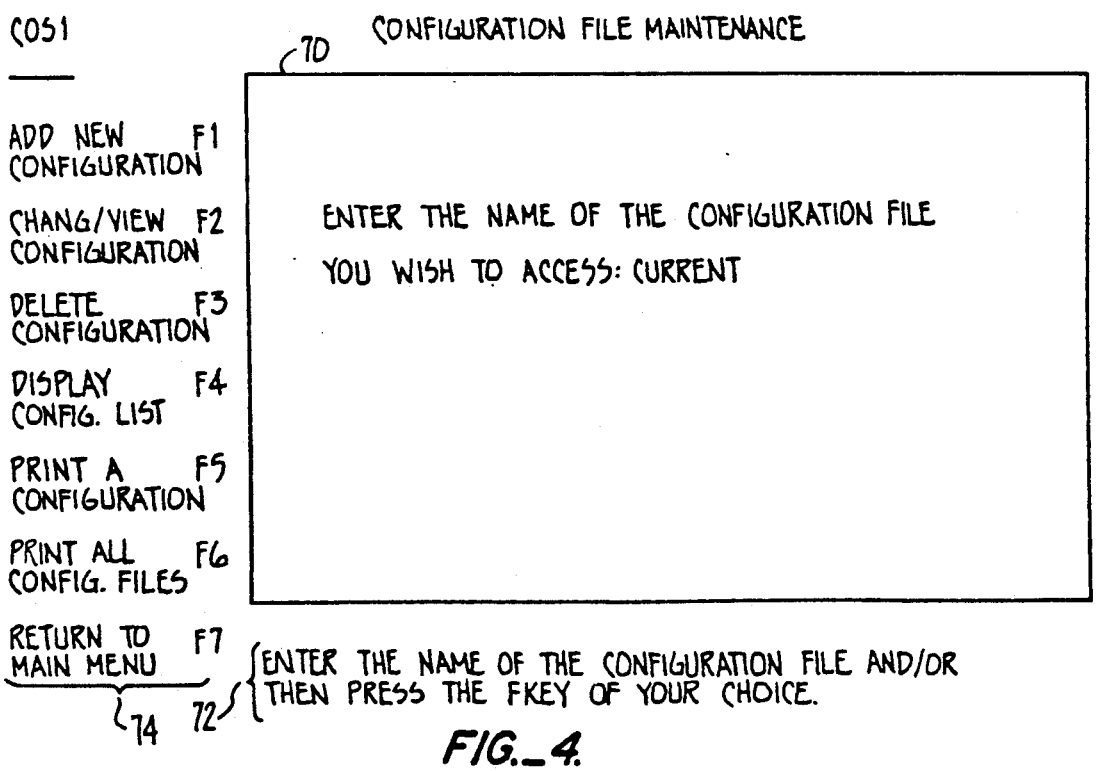
FIG._4.

```
COS1                    CHANGE CONFIGURATION
```

| | |
|---|---|
| FILE THIS    F1<br>CONFIGURATION | CONFIGURATION ID: CURRENT<br>RECEIVE FILE NAME: RECEIVE.DAT |

```
                CONFIGURATION ID: CURRENT
FILE THIS   F1  RECEIVE FILE NAME: RECEIVE.DAT
CONFIGURATION
                FREQUENCIES:
RESET THIS  F2
CONFIGURATION     VIDEO/RF:     4060 MHz      START CODE:  002
                  AUDIO A:      6.90 MHz
                  AUDIO B/DATA: 5.60 MHz      STOP CODE:   003
                  LNB:          5150 MHz
MAKE THIS   F4  SATELLITE INFORMATION:        PORT INFORMATION:
THE CURRENT
                  VIDEO INVERT:            Y    PORT:      COM1
PRINT THIS  F5    WIDE/NARROW?: AUDIO A:   W    BAUD:      1200
CONFIGURATION                   AUDIO B/DATA: N  BITS:     8
                                               PARITY:    NONE
                                               STOP BITS: 1

RETURN TO   F7
MAIN MENU       TYPE IN THE NAME OF THE TRANSMISSION RECEIVE FILE.
                (DOCUMENTATION ONLY) OR PRESS THE FKEY OF YOUR CHOICE
```

*FIG._5.*

```
COS1                    SATELLITE COMMUNICATION MENU

STOP        F1
COMMUNICATION

START DATA  F2  ENTER THE NAME OF THE RECEIVE FILE
TO FILE
                YOU WISH TO USE:    RECEIVE.DAT
START DATA  F3
TO PRINTER

START DATA  F4
TO SCREEN

SET STX     F5
FLAG TO ON

RETURN TO   F7
MAIN MENU       ENTER THE NAME OF THE RECEIVE FILE AND/OR
                PRESS THE FKEY OF YOUR CHOICE.
```

*FIG._6.*

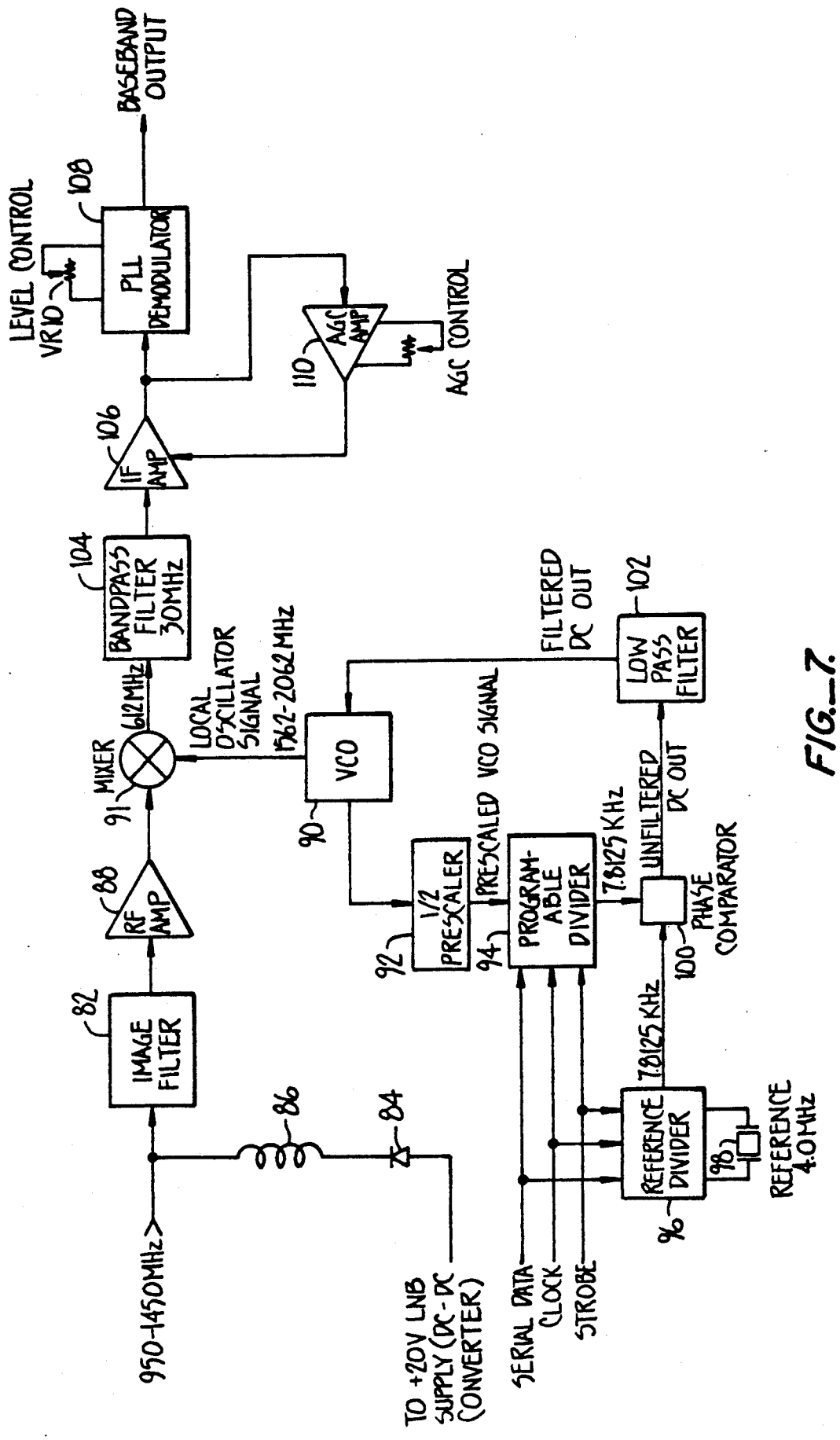
FIG._7.

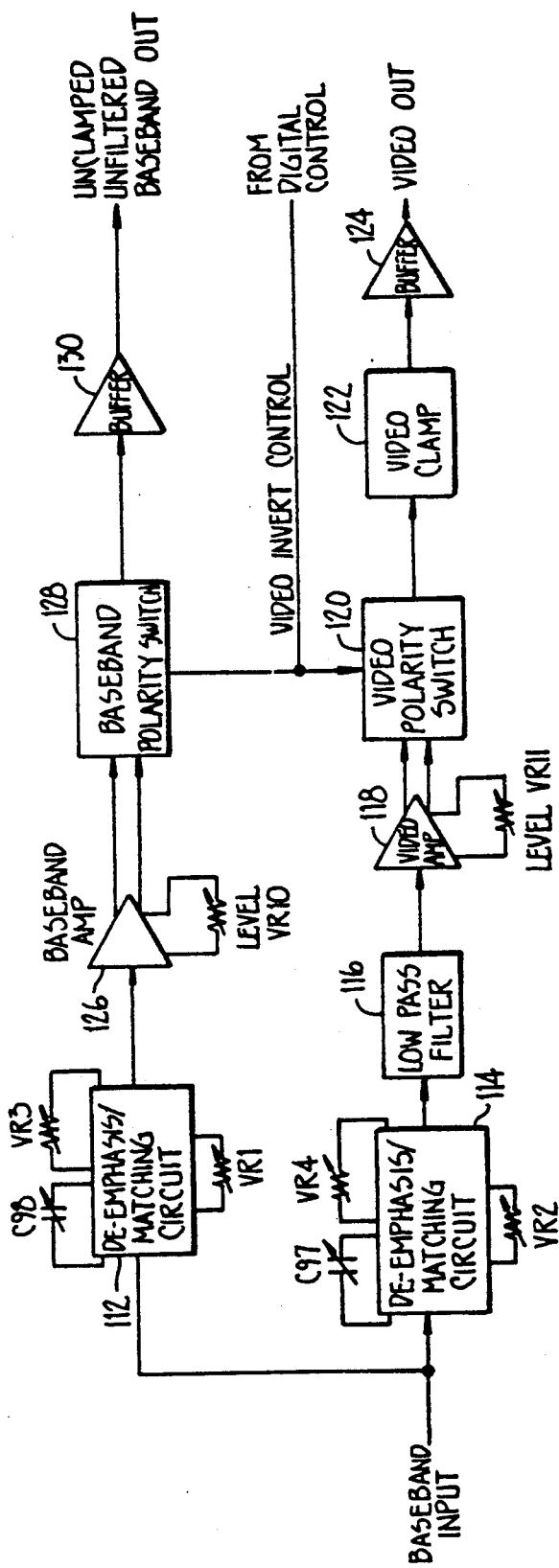
FIG._8.
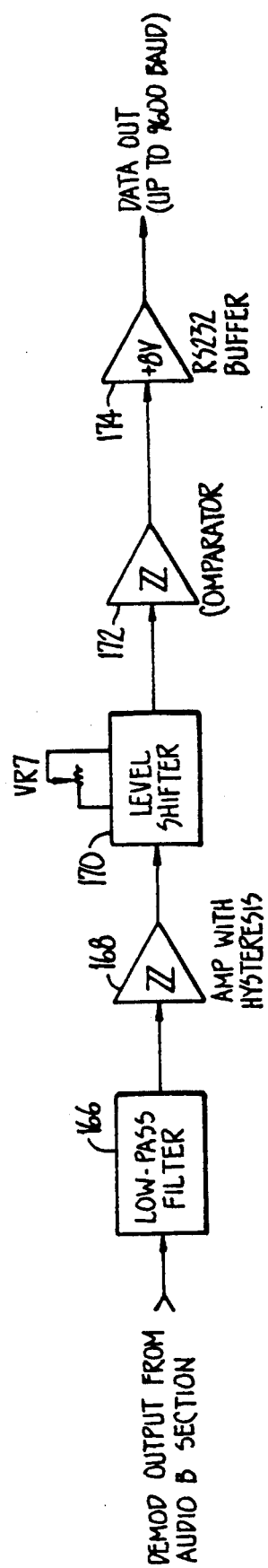
FIG._10.

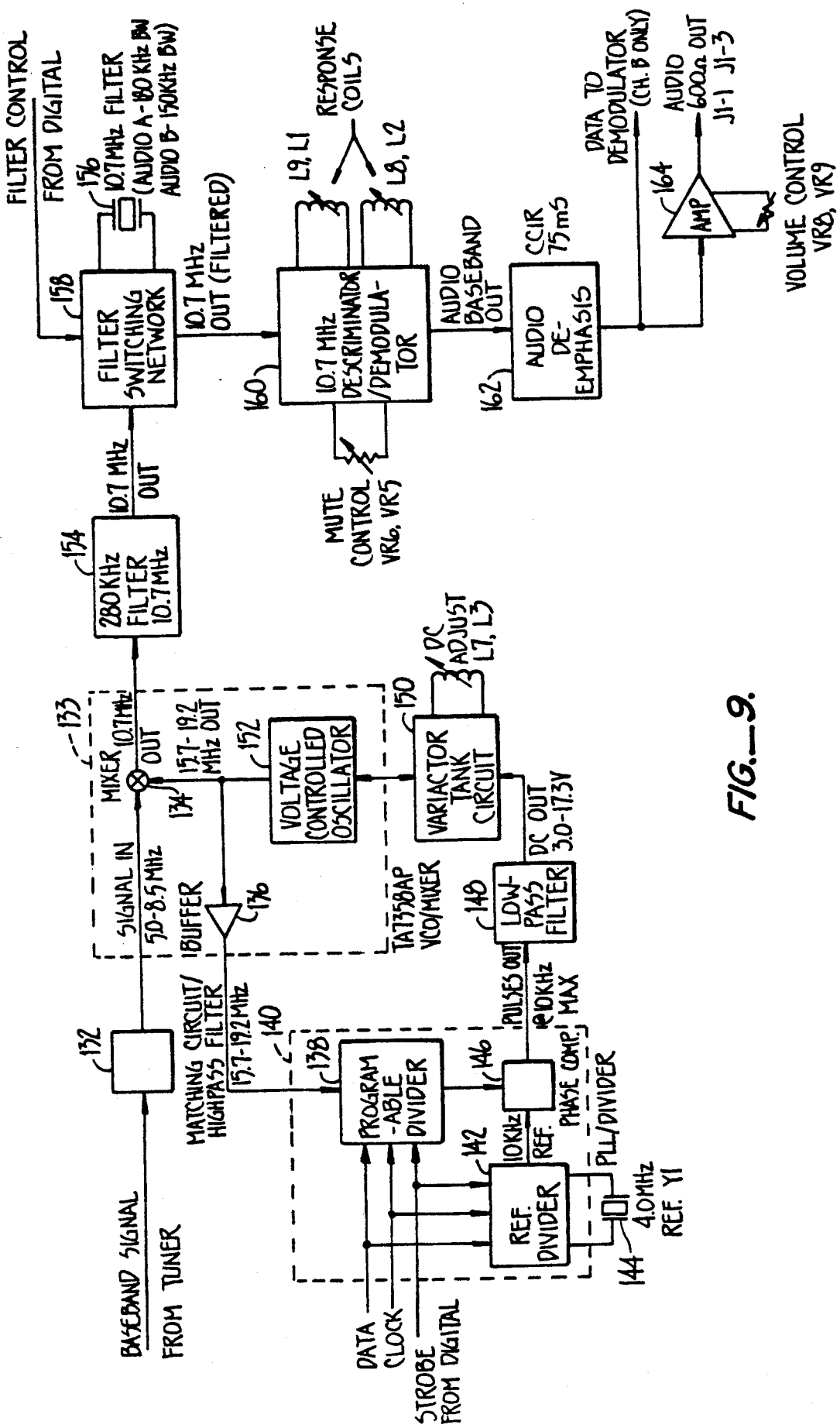
FIG._9.

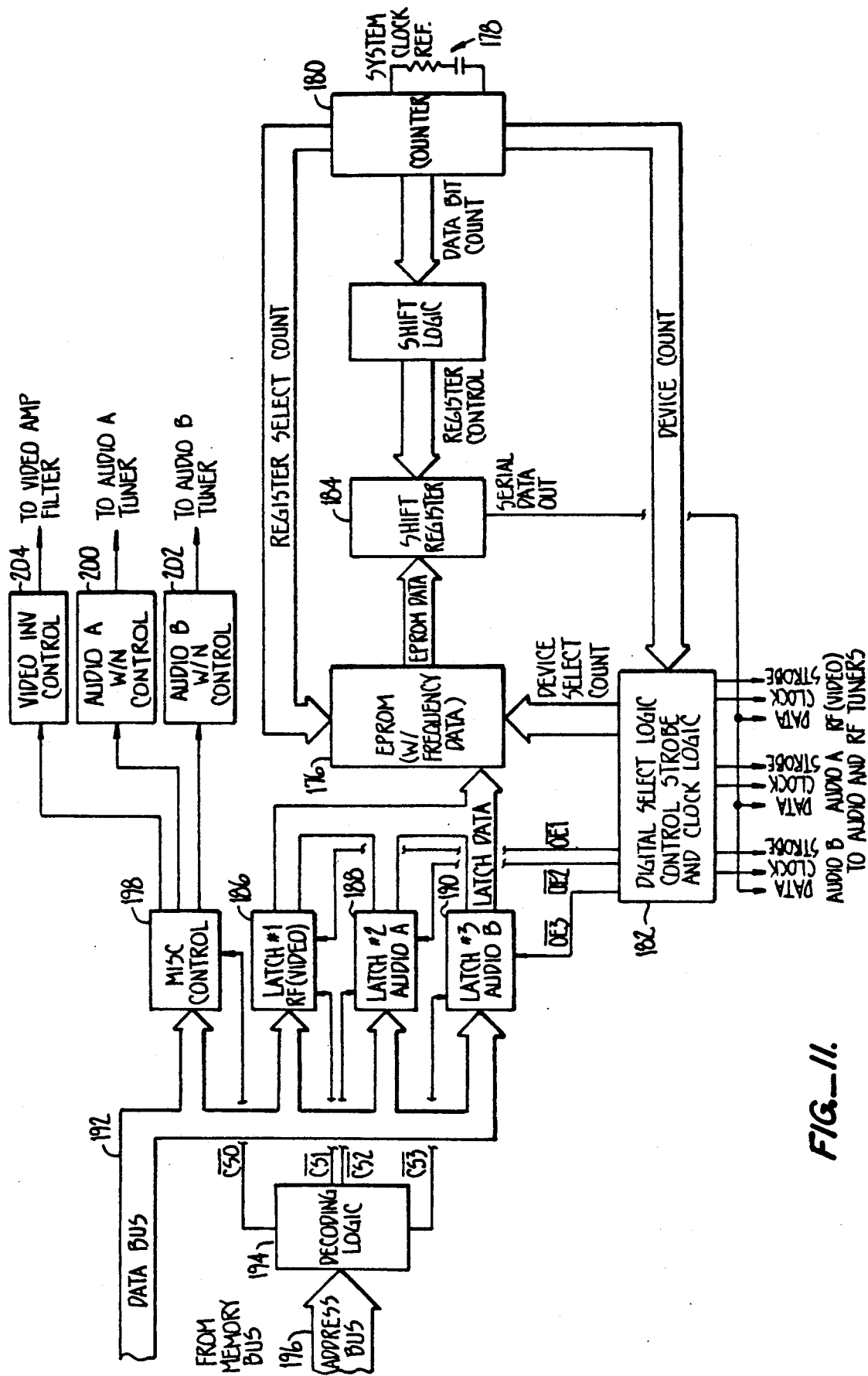
FIG._11.

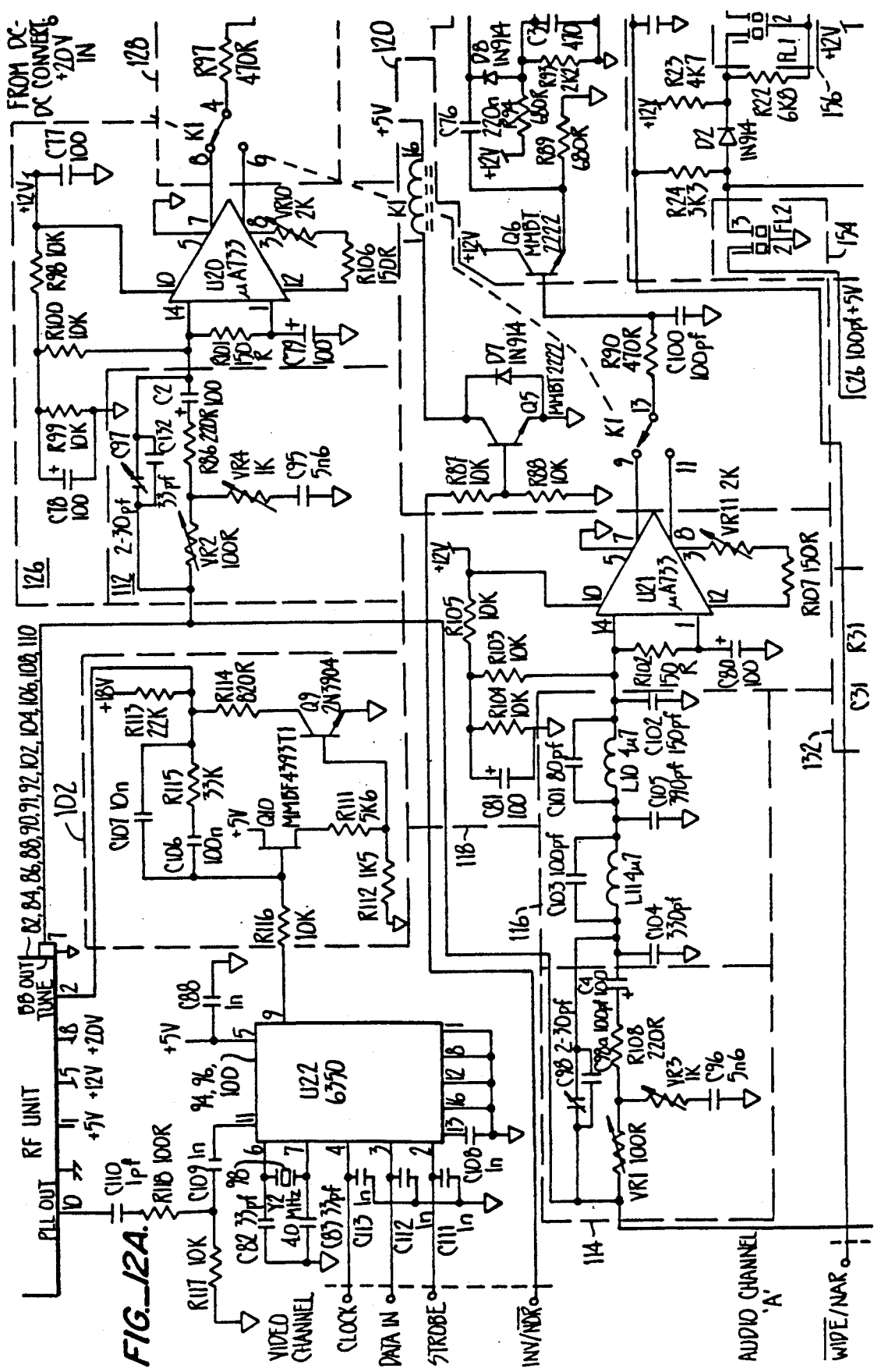
FIG._12A.

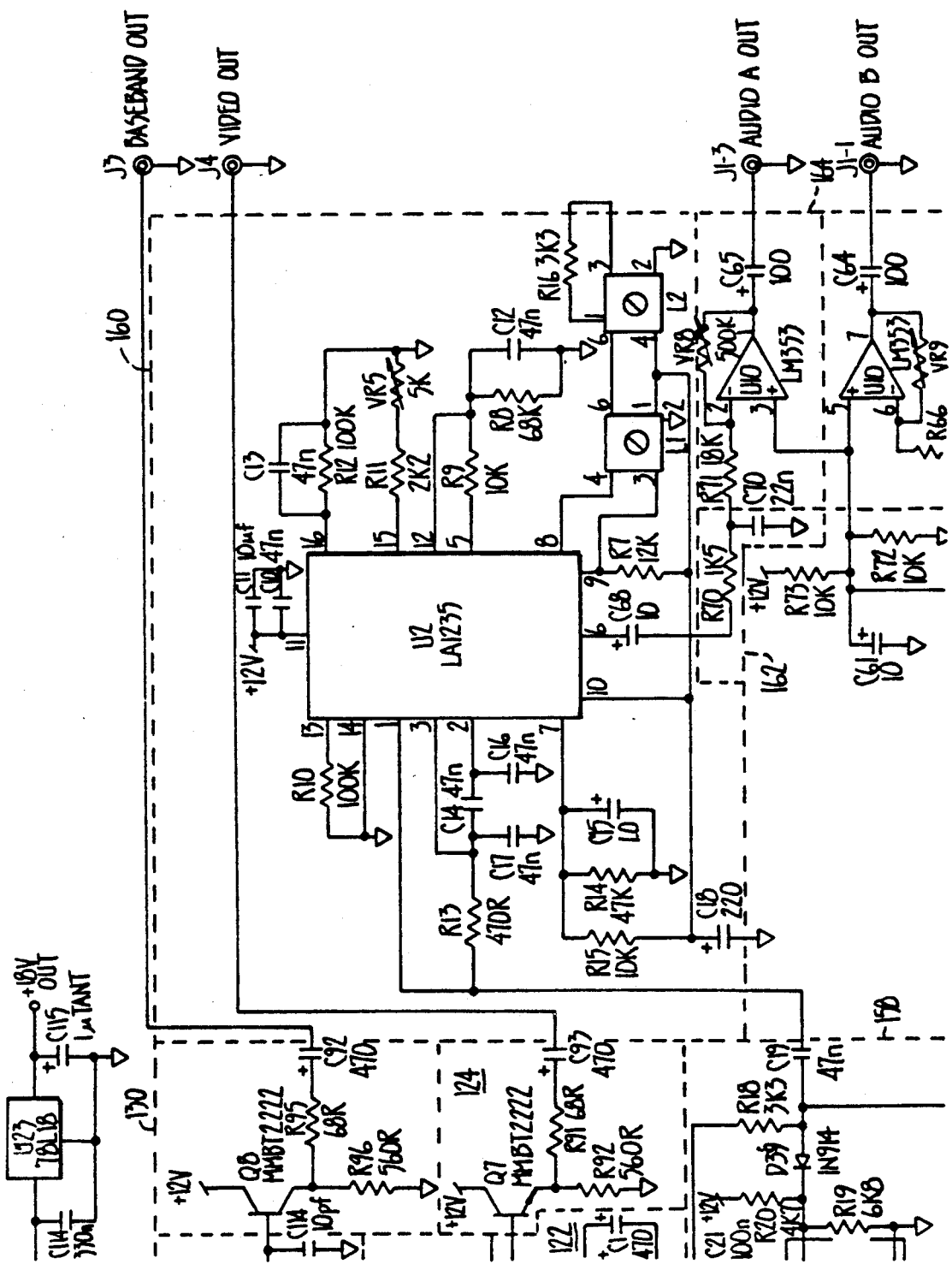
FIG_12B.

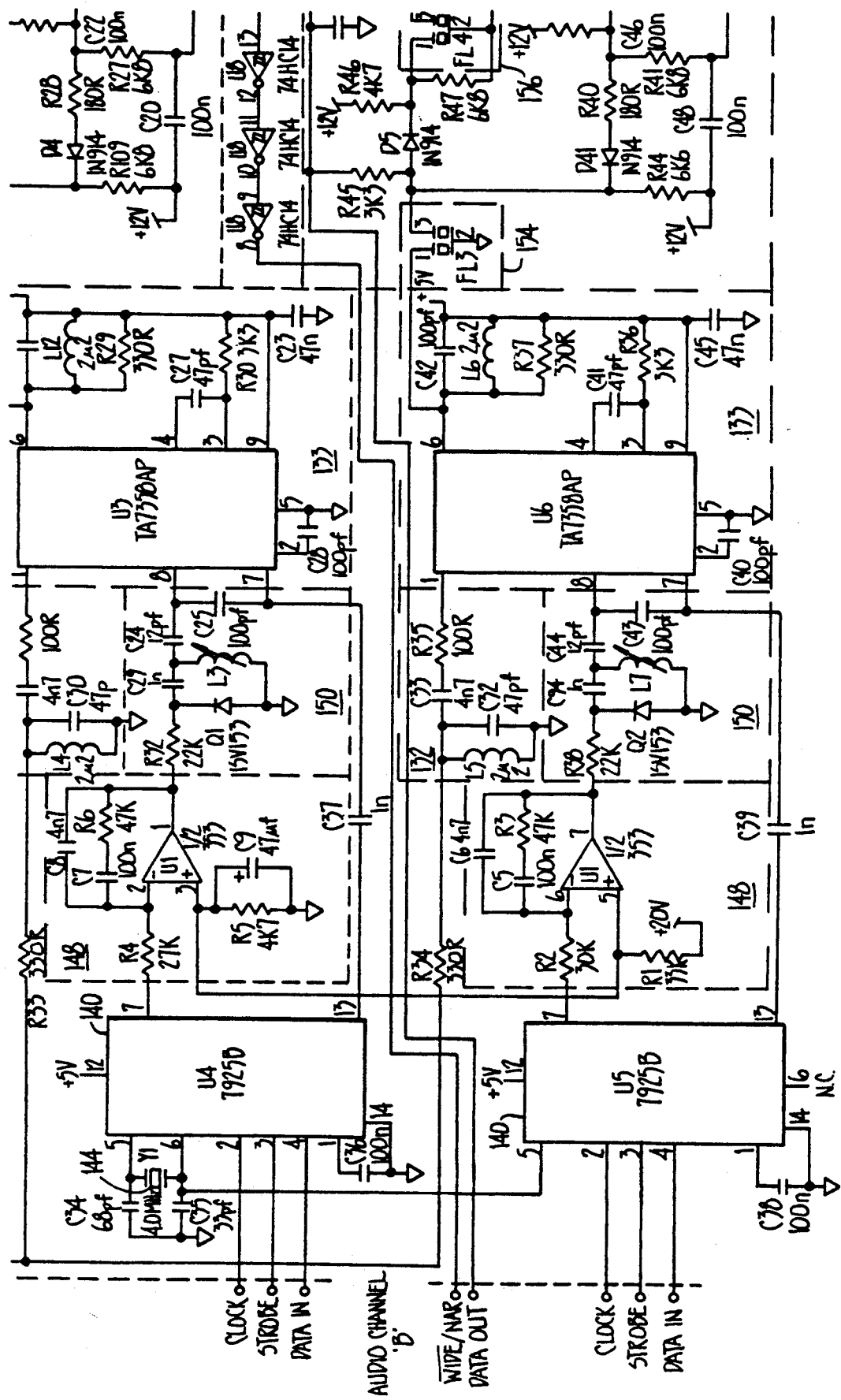
FIG._12C.

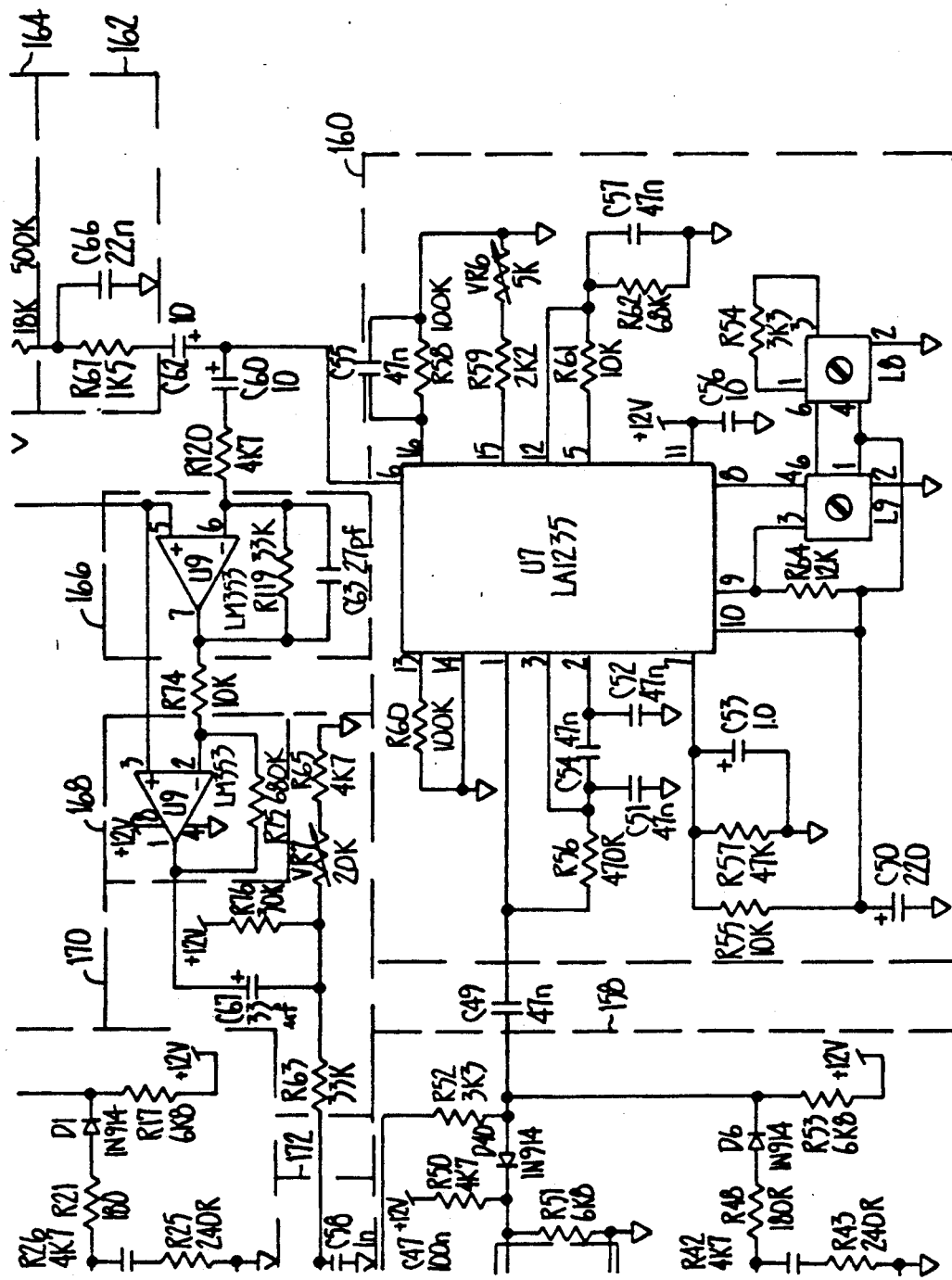
FIG._12.
FIG._12D.

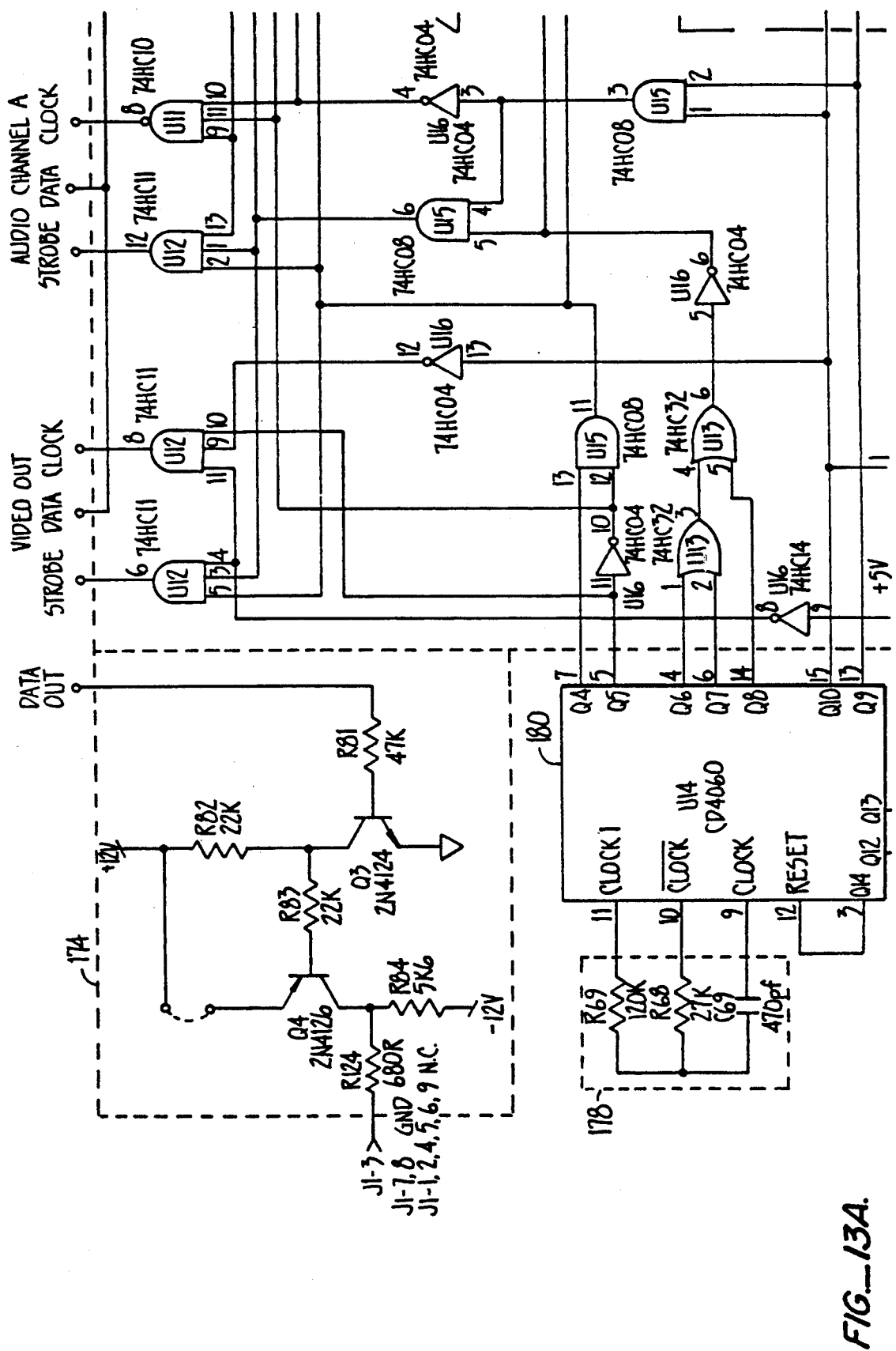
FIG_13A.

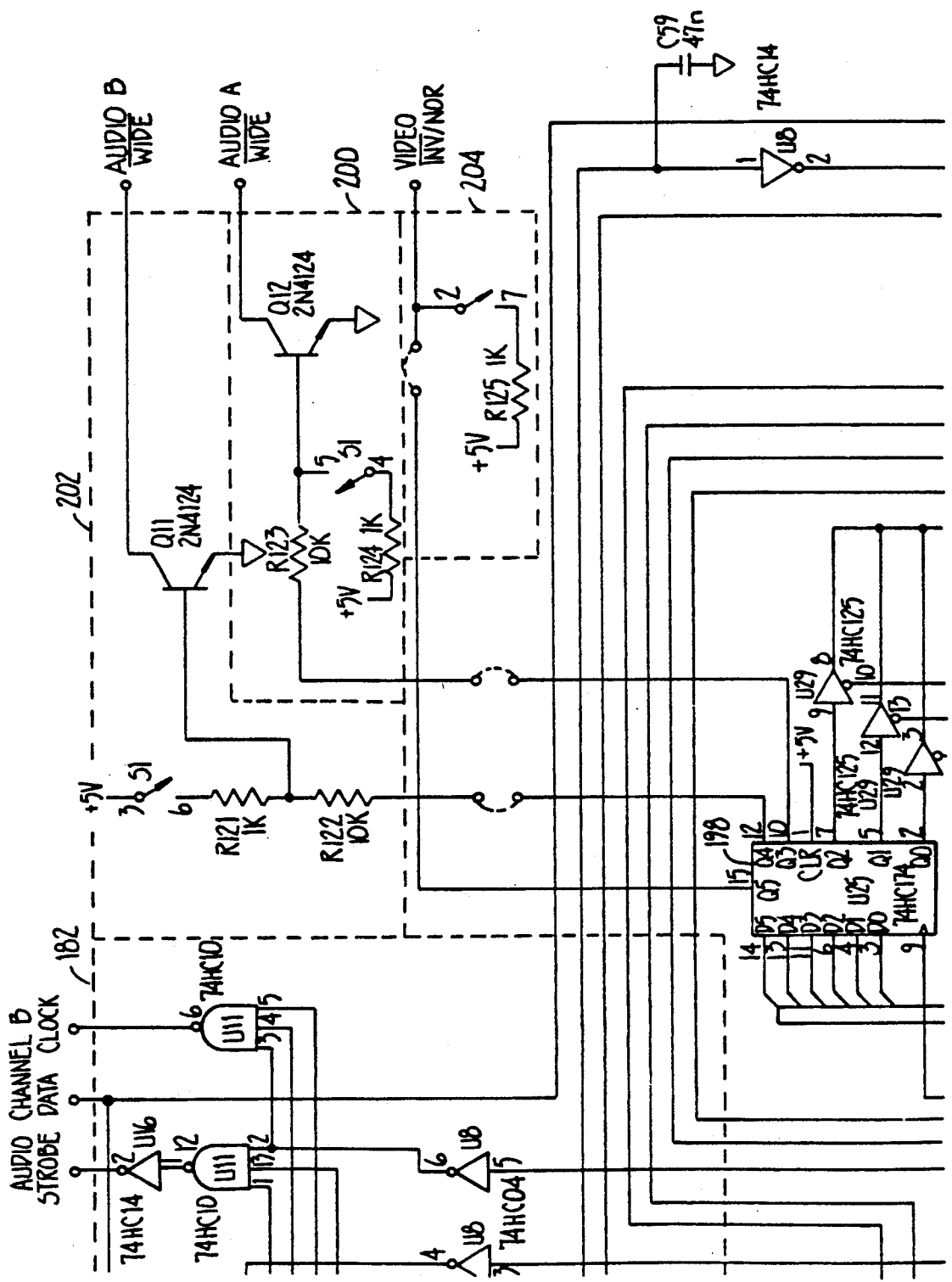
FIG._13B.

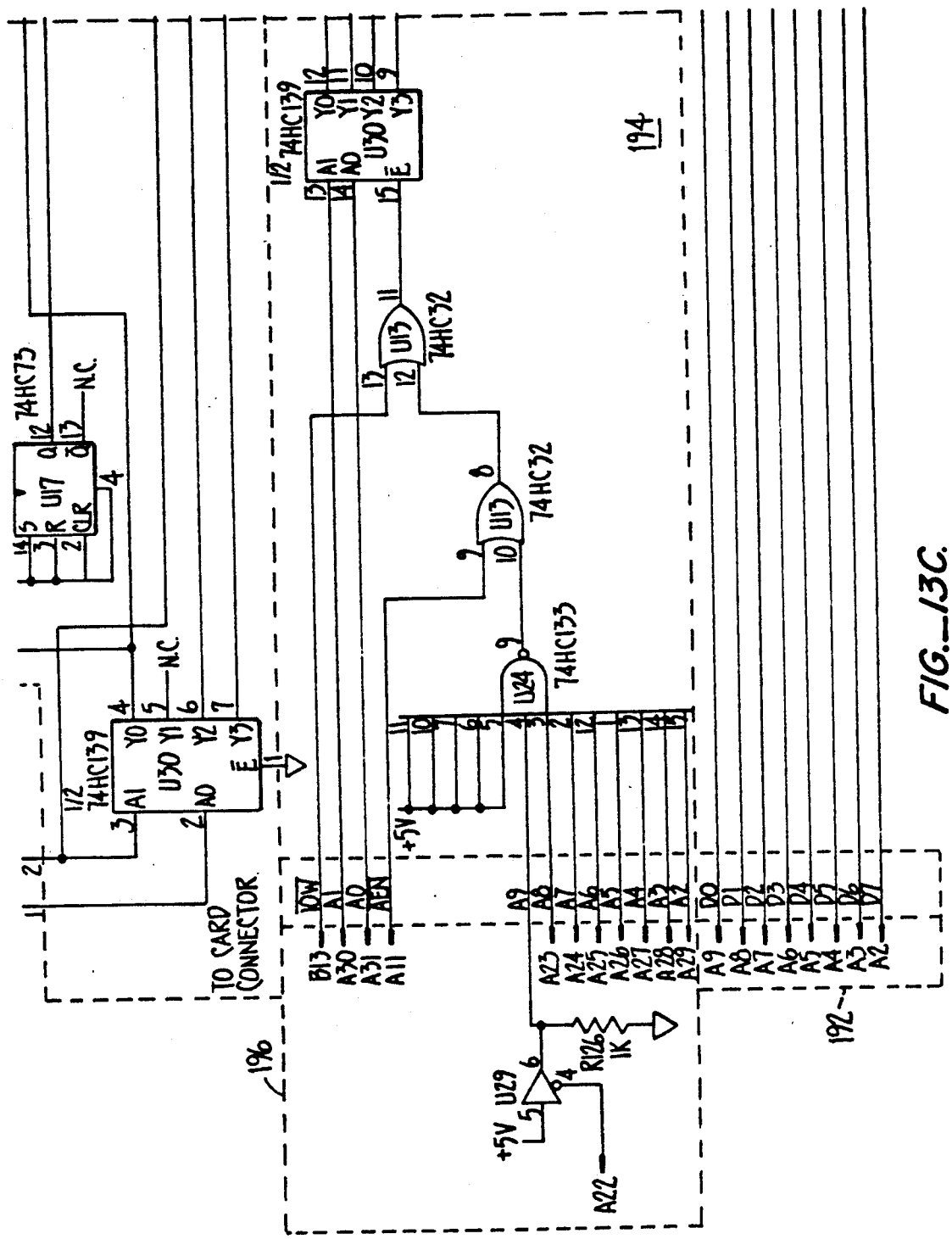
FIG._13C.

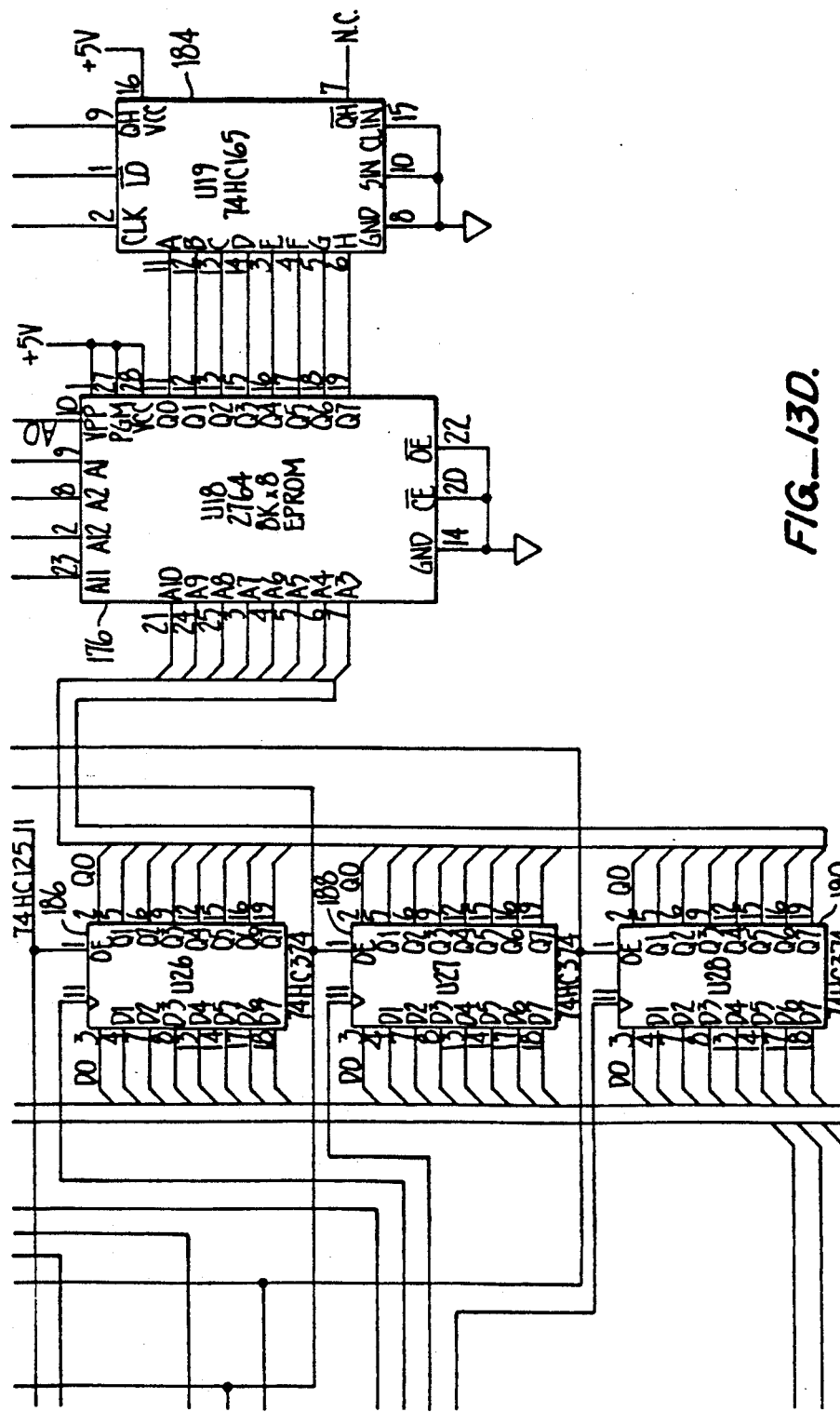

APPARATUS FOR ADAPTING COMPUTER FOR SATELLITE COMMUNICATIONS

REFERENCE TO RELATED APPLICATION

This is a continuation-in-part of U.S. application Ser. No. 008,306 filed Jan. 29, 1987 now abandoned.

FIELD OF THE INVENTION

This invention pertains to the adaptation of computers to the reception and demodulation of satellite broadcast signals. More particularly, the invention provides receiver/demodulator apparatus for interfacing between a computer and a satellite communication receiving antenna.

BACKGROUND OF THE INVENTION

There has been a widespread proliferation of satellite communications systems in recent years. Many consumers have acquired satellite communications equipment for home reception of satellite broadcast television signals, and many businesses have acquired such equipment for the purpose of receiving and/or transmitting useful business data. However, proper configuration and use of conventional satellite communications equipment can require considerable technical skill beyond the capabilities of the average consumer or business person.

The present invention simplifies the configuration and usage of satellite communications equipment so that a relatively unskilled consumer or business person can obtain maximum advantage from such equipment with comparatively little effort. This is accomplished by equipping a computer with special purpose hardware and software, so that the computer may control all facets of the satellite communications operation in a manner which the user can easily define and readily adapt to changing situations.

The hardware consists of a complete audio, video and data satellite receiver/demodulator built onto one IBM/PC compatible peripheral card-sized circuit board. Power and tuning information is obtained from the computer's system bus. Data received from the satellite may be supplied to the computer via an RS-232 compatible serial interface. The hardware provides baseband output which is compatible with either the VC/II, B-MAC, or OAK descrambling systems; 950 to 1450 megahertz ("MHz") digitally synthesized RF tuning; compatibility with both the C and Ku satellite communication bands; two separate digitally synthesized audio channels, one of which can be used to demodulate frequency shift keyed ("FSK") data at rates up to 9600 baud; programmable audio and RF tuning, as well as programmable audio bandwidths and video invert; a capability to disable all programmable functions with a special system electronically programmable read only memory ("EPROM"); and, an on-board 20 volt power converter for supplying power to a satellite receiver's low noise block down-converter ("LNB").

SUMMARY OF THE INVENTION

In a preferred embodiment, the invention provides apparatus for receiving and demodulating a satellite broadcast signal, comprising a programmable radio frequency tuner/demodulator for demodulating the broadcast signal to produce a baseband output signal; a video demodulator for demodulating the baseband output signal to produce a video output signal; a first programmable audio frequency tuner/demodulator for demodulating the baseband output signal to produce a first audio output signal; a second programmable audio frequency tuner/demodulator for demodulating the baseband output signal to produce a second audio output signal; and, a data demodulator for demodulating the second audio output signal to produce a data output signal.

Preferably, the apparatus includes addressable storage means for storing tuning data representative of one or more tuning frequencies; data receptor means for receiving address data from an external source such as a computer; and, a control means for decoding the address data to produce the address of a corresponding storage location within the storage means, extracting the tuning data from that corresponding storage location, and then programming the radio frequency tuner/demodulator with the tuning data.

Advantageously, a voltage controlled oscillator is provided for producing a local oscillator output signal having a frequency determined by an input reference signal. A reference oscillator is also provided to produce a fixed frequency reference output signal. A programmable divider divides the local oscillator output signal by an amount determined by the aforementioned tuning data, and a programmable reference divider divides the fixed reference frequency output signal by an amount which is also determined by the tuning data. A comparator compares the frequency of signals output by the programmable divider with the frequency of signals output by the programmable reference divider and produces an output signal representative of the difference between said signal frequencies, said difference comprising the voltage controlled oscillator's input reference signal.

The first programmable radio frequency tuner/demodulator preferably includes a signal mixer for mixing the baseband output signal with the local oscillator output signal to produce an intermediate frequency output signal, a bandpass filter for bandpass filtering the intermediate frequency output signal to produce a filtered intermediate frequency output signal, an intermediate frequency amplifier for amplifying the filtered intermediate frequency output signal, an automatic gain control means for controlling the gain of the intermediate frequency amplifier, and a signal demodulator for demodulating the amplified, filtered intermediate frequency output signal.

The video demodulator advantageously includes a first deemphasis circuit for deemphasizing the baseband output signal, a low pass filter for low pass filtering the deemphasized baseband output signal, a first amplifier for amplifying the filtered, deemphasized baseband output signal, a first polarity switcher for controllably switching the polarity of the amplified, filtered, deemphasized baseband output signal, and a clamp for removing dispersion from the amplified, filtered, deemphasized baseband output signal.

Preferably, the video demodulator is also capable of demodulating the baseband output signal to produce an unclamped, unfiltered baseband output signal. This is accomplished, in the preferred embodiment, with the aid of a second deemphasis circuit for deemphasizing the baseband output signal, a second amplifier for amplifying the deemphasized baseband signal output by the second deemphasis circuit, and a second polarity switcher, coupled to the first polarity switcher, for controllably switching the polarity of the amplified, deemphasized baseband signal output by the second amplifier to produce the unclamped, unfiltered, baseband output signal.

First and second programmable audio frequency tuner/demodulators are provided for demodulating the baseband output signal to produce first and second audio output signals respectively. The aforementioned control means assists by decoding the address data to produce the addresses of corresponding storage locations within the storage means containing tuning data for tuning the first and second audio tuner/demodulators, extracting the audio tuning data from the corresponding storage locations, and programming the audio frequency tuner/demodulators with the audio tuning data. Each of the two audio tuner/demodulators incorporates a voltage controlled oscillator which produces a local oscillator output signal at a frequency determined by an input reference signal. Separate reference oscillators produce first and second fixed frequency reference output signals respectively. A pair of programmable dividers receive the audio tuning data and divide the local oscillator output signals by amounts which are determined by the audio tuning data. A pair of programmable reference dividers also receive the audio tuning data and divide the fixed reference frequency output signals by amounts which are also determined by the audio tuning data. A pair of comparators compare the frequency of signals output by the programmable dividers with the frequency of signals output by the programmable reference dividers and produce output signals representative of the difference between the signal frequencies, these differences comprising the voltage controlled oscillator input reference signals.

A pair of signal mixers mix the baseband output signal with the local oscillator output signals to produce a pair of intermediate frequency output signals. Separate first bandpass filters bandpass filter the intermediate frequency output signals to produce a pair of filtered intermediate frequency output signals. A first pair of switchable bandpass filter are provided for bandpass filtering the intermediate frequency output signals within a narrow frequency pass band to produce a pair of narrowly filtered intermediate frequency output signals. A second pair of switchable bandpass filters are provided for bandpass filtering the intermediate frequency output signals within a wide frequency pass band to produce a pair of widely filtered intermediate frequency output signals. A filter switching means controllably actuates one or the other of each pair of first and second switchable bandpass filters.

The data demodulator incorporates a first amplifier for amplifying the second audio output signal to produce an amplified replica thereof, a voltage level shifter for shifting the voltage level of the amplified replica signal, and a comparator for comparing the width of signal pulses output by the voltage level shifter with a reference pulse width and for adjusting the width of the signal pulses to equal the reference pulse width.

The control means preferably also functions to receive polarity switching data from the external source (i.e. computer) and to transmit the polarity switching data to the first and second polarity switchers, thereby causing the polarity of the video output signal and the polarity of the unclamped, unfiltered, baseband output signal to adopt the state represented by the polarity switching data. The control means further functions to receive filter switching data from the external source (i.e. computer) and to transmit the filter switching data to the filter switching means, thereby actuating one or the other of the first and second switchable band-pass filters.

The data output signal may contain tuning data for programming the radio frequency tuner/demodulator, the first and second audio tuner/demodulators, in which case, the control means preferably also functions to decode the address data to produce the addresses of corresponding storage locations within the storage means containing tuning data for tuning each of the tuner/demodulators, to extract the tuning data from those storage locations, and to program each of the tuner/demodulators with the appropriate corresponding tuning data. In such case, coupling means are provided for coupling the data output signal to the control means, thereby facilitating remote programming of the various tuner/demodulators.

BRIEF DESCRIPTION OF THE DRAWINGS

FIG. 1(a) is a plan view of a satellite communications receiver/demodulator constructed in accordance with the preferred embodiment of the invention and illustrates the principal functional components of the apparatus. FIG. 1(b) is an end view of the receiver/demodulator of FIG. 1(a), showing the input/output connections and the manner in which the apparatus is connected to a satellite communications antenna, descrambler and monitor.

FIG. 2 is similar to FIG. 1(a), but shows selected circuit components in greater detail.

FIG. 3 depicts the Main Selection Menu displayed by the system software on the user's computer screen to simplify the user's interaction with the apparatus.

FIG. 4 depicts the Configuration File Maintenance Menu displayed by the system software on the user's computer screen to simplify the user's creation, modification and storage of configuration files containing parameters for use in selected satellite signal reception situations.

FIG. 5 depicts the Change Configuration Menu displayed by the system software on the user's computer screen to further simplify the user's creation, modification and storage of configuration files containing parameters for use in selected satellite signal reception situations.

FIG. 6 depicts the Satellite Communication Menu displayed by the system software on the user's computer screen to simplify the user's initiation of satellite signal reception and to simplify the user's storage, printing or displaying of data received from a satellite.

FIG. 7 is a functional block diagram of the RF tuner/demodulator of the preferred embodiment.

FIG. 8 is a functional block diagram of the video demodulator/filter of the preferred embodiment.

FIG. 9 is a functional block diagram of one channel of the receiver audio section of the preferred embodiment.

FIG. 10 is a functional block diagram of the data demodulator of the preferred embodiment.

FIG. 11 is a functional block diagram of the digital control circuitry of the preferred embodiment.

FIG. 12 is a circuit schematic diagram of the analog circuitry of the preferred embodiment.

FIG. 13 is a circuit schematic diagram of the digital circuitry of the preferred embodiment.

DETAILED DESCRIPTION OF THE PREFERRED EMBODIMENT

The preferred embodiment will first be described from the point of view of a typical user. A detailed technical description of the preferred embodiment will then be provided.

Operation by Typical User

Overview

The invention provides, on a single circuit card, apparatus capable of receiving and demodulating video, audio and/or data signals broadcast from a satellite and which can be installed in an IBM PC- or AT- compatible computer. By integrating several functional units onto a single circuit card, and by using the computer to perform communication control and data capture functions, the invention facilitates reduced cost, miniaturized satellite communications. With the aid of an appropriate antenna and low noise block downconverter (neither of which comprise part of the present invention), the apparatus can be tuned to receive signals at any frequency in either the C or Ku communication bands. The receiver's tuning functions are controllable, with the aid of special purpose software, directly from the computer's bus; or can be hardware selected in a manner which prevents alteration by the computer. Potentially, the receiver's tuning functions may even be programmed by data incorporated in a data stream received from the satellite. Video and stereo audio outputs are provided by the receiver. Data received from the satellite is routed to an RS-232 serial data output port for use by the computer or other applications hardware.

System Description

The apparatus functions and their interrelationship with one another will now be described with reference to FIGS. 1(a) and 1(b).

Satellite Reception

Audio, video, and data signals are transmitted to satellite 10 from a remote uplink site 11 in the frequency range of either 6 gigahertz ("GHz") or 14 Ghz. These signals are received by satellite 10, which is in geostationary orbit over the earth's equator. Satellite 10 rebroadcasts the signals toward the earth at a lower frequency of either 4 Ghz (the "C" communications band) or 12 Ghz (the "Ku" communications band). The rebroadcast signals are receivable by users at "earth stations" or "downlink sites" distributed over a wide area on the earth's surface; for example, over all of North America in the case of most satellites likely to be of interest to users situate in North America.

A downlink site incorporates a satellite receiving antenna dish 12 (probably less than about 1.8 meters in diameter) which focuses the satellite signal onto a feedhorn 14 which guides the signal, with the correct polarization, to a low noise block downconverter ("LNB") not shown, but associated with feedhorn 14). The LNB amplifies the signal to usable levels and converts it to an intermediate frequency ("IF") band. For C band communications, the signal reaching the LNB is in the 3.7 to 4.2 GHz range, and is down-converted by the LNB to the 950 to 1450 MHz IF range. For Ku band communications, the satellite signal reaches the LNB in the 11.7 to 12.2 GHz range, and is again converted by the LNB to the 950 to 1450 MHz IF range. This lower frequency range IF signal can easily be fed indoors via inexpensive coaxial cable 16, and thence coupled to receiver/demodulator 18 (which is mounted inside a computer—not shown).

RF Tuner/Demodulator

The IF signal output by the LNB is fed directly into RF tuner/demodulator 20, which in turn supplies power to the LNB via cable 16. RF tuner/demodulator 20 amplifies and filters the IF signal, then tunes to a specific transponder frequency within the IF band (each transponder frequency band is usually 36 MHz wide) to yield a second IF signal. Tuning is accomplished with the aid of a crystal controlled phase locked loop ("PLL") circuit. Once the signal is converted to the second IF (612 MHz) band, it is conditioned through a 24 MHz filter and demodulated to produce a baseband signal. RF tuner/demodulator 20 is a completely shielded metal unit. The tuner can be programmed in 1 MHz increments to tune any frequency within the first (i.e. 950 to 1450 Mhz) IF band.

Video Processing

The baseband signal demodulated by the PLL tuner is used to produce video and audio signals; and, a de-emphasized version of the baseband signal for external descrambler connection. The output signal provided at video connector 22 has been clamped, filtered, de-emphasized and amplified. On the other hand, the output signal provided at baseband connector 24 has only been de-emphasized and amplified.

Audio Processing

The baseband signal output by RF tuner/demodulator 20 is also input to audio "A" and "B" tuner/demodulator circuits 26 and 28 respectively. The audio signals are on separate sub-carriers, so additional tuners are needed to receive them. Two independent audio tuners are provided, to facilitate reception of direct stereo broadcasts. Each tuner provides a filtered and amplified 600 ohm output.

Audio B tuner/demodulator 28 also acts, in conjunction with data demodulator 32, as a data tuner/demodulator. When tuner/demodulator 28 is set to receive a sub-carrier bearing FSK modulated data, the demodulated data is converted to RS-232 compatible voltage and current levels, and output via 9-pin D-type female connector 30. To access this data, the user need only connect a serial data cable between connector 30 and computer 19's serial data input port.

Controlling the Satellite Receiver

The RF tuning, and either of the Audio A or Audio B sub-carrier tuner frequencies, can be set by simply writing the appropriate value into the proper hardware register, addressed as a PC I/O port. This can be done either with the aid of the system software, as hereinafter described in greater detail; or, with the aid of custom application software developed by the user. More particularly, with the aid of the system software, the user may create and modify a "configuration file" containing data parameters representative of: (a) the video carrier frequency, and whether the video signal is to be inverted or not; (b) the two audio sub-carrier frequencies, and whether they are to be processed by wide or narrow bandwidth filters; and, (c) the frequency of the local oscillator in the LNB.

After creating a configuration file as aforesaid, the user indicates, via the system software, that satellite signal reception is to commence. The system software transmits the pre-defined data parameters from the configuration file to receiver 18, causing communications to commence in the manner defined by the user's data parameters. At any time, the user may change the data parameters, causing the system software to transmit the new parameters to receiver 18, thereby altering the communication process in the appropriate manner.

Processing Received Data

Data routed to serial data communications port 30 can be processed by computer 19 either with the aid of the system software, or with the aid of custom application software developed by the user. Using the system software, the user can specify the characteristics of the serial port, and direct that the received data be displayed on monitor 21, sent to a printer, or saved in a disk file for later processing. The software allows the user to alter the data destination at any time, and to stop reception of data at any time.

Configuring the Apparatus for Specific Services

All communication, data storage and other parameters are stored on disk in configuration files accessible by computer 19. There may be any number of such files stored on disk for various satellite channels, data rates, data formats, etc. At any one time there will be only one configuration file active, defining the "current" communication parameters. With the aid of the system software, the user first selects a configuration file, which becomes the "current" configuration; then initiates satellite signal reception. The user may change configuration files at any time, for example in order to change the parameters of the serial data communicated via port 30; to alter the signal frequencies and sub-carriers the apparatus is to use; etc. The system software also enables the user to add, change, delete, or print selected configuration files.

Because the communication parameters are programmable, and because the apparatus can receive data demodulated from the satellite signal, a satellite service could potentially remotely reconfigure some or all of the communication parameters from uplink site 11. This would merely require the use of a means for coupling data signals received from satellite 10 back into computer 19, so that computer 19 could use the data to reprogram the operation of receiver/demodulator 18.

To use apparatus, the user must supply satellite antenna 12 with a suitable mount 34, feedhorn 14 together with an associated LNB, cable 16 to connect between the LNB and receiver/demodulator 18, and an IBM PC, AT or compatible computer 19. If video and audio signals are to be received, then the user must also supply a video and audio monitor 36, together with appropriate cabling 56, 60, 66 for connecting monitor 36 to receiver/demodulator 18. If scrambled signals are to be received, then the user must also supply descrambler 62.

The Satellite Antenna

If a fixed satellite dish antenna is employed, then signals will be receivable from only the one satellite at which antenna is pointed. If signals are to be received from more than one satellite, then the user must also supply an antenna positioner 38.

Computer Requirements

Computer 19 must provide one full length 8-bit slot for insertion of receiver/demodulator 18; a serial data communication port (if computer 19 is to receive data from the satellite); a colour or monochrome monitor 21 interfaced to computer 19; and, an IBM-compatible printer with parallel interface (if data received from the satellite is to be printed). The user must also ensure that computer 19's power supply has sufficient capacity for the apparatus to operate properly (see below under "Computer Connections").

Receiver/demodulator 18 does not require any of computer 19's random access memory ("RAM) to operate. However, the system software requires at least 320K of RAM to function. It is recommended that computer 19 be equipped with 640K RAM. The system software will run under the control of a diskette-based operating system. However, if received data is to be stored, then it is recommended that computer 19 be equipped with a hard drive, since the accumulated, received data may quickly exceed the storage capacity of a floppy diskette. Typically, at least 1 megabyte of free space should be available on the hard disk for storing received data.

Installing the Receiver/Demodulator

Receiver/demodulator 18 may be installed in any of computer 19's available expansion slots. It is however recommended that receiver/demodulator 18 be installed in slot #1, since this affords the easiest access to the hardware override switches 40 (hereinafter described in greater detail). The apparatus uses four bytes of I/O address at computer memory locations $1FC to $1FF. The user must ensure that no other expansion cards present in computer 19 use the same locations.

Hardware Override

Hardware override switches 40 allow the user to override some of the functions normally controlled by computer 19 with the aid of the system software. These functions are the Audio A and Audio B filter bandwidths, and the Video polarity. By manually setting hardware override switches 40 to the correct positions, and/or by removing integrated circuit U25 (FIG. 2), any of these functions can be controlled.

The insets in FIGS. 1(a) and 2 show the location of hardware override switches 40. Switches 44 and 46 control the video signal polarity. Switches 48 and 50 control the Audio A and Audio B filter bandwidths. These switches are now described in greater detail.

The Video Polarity Switches

Switch 44 is the PC/MANUAL switch. For normal operation (that is, control of receiver/demodulator 18 by computer 19, with the aid of the system software), switch 44 is set to the "PC" position. In addition, the NORMAL/INVERT switch 46 should be set to the "INV" position. To set the video polarity manually, PC/MANUAL switch 44 is set to the "MANUAL" position, thereby enabling manual control of the video polarity function via NORMAL/INVERT switch 46. In this case, if NORMAL/INVERT switch 46 is set to the "NORMAL" position, the video signal polarity is set to normal for C band reception. If switch 46 is set to the "INV" position, then the video signal is inverted (that is, inverted with respect to normal C band reception).

The Audio Filters Bandwidth Switches

Both the Audio A and the Audio B filters can be selected manually, but to do this the user must first remove integrated circuit U25 (FIG. 2) from its socket. When either of the AUDIO A or AUDIO B switches 50, 48 is set to the "WIDE" position, a wideband filter (280 KHz bandwidth) is used for that channel. This filter is required to retrieve undistorted audio signals from sub-carriers which are 150 to 280 KHz wide. When either of AUDIO A or AUDIO B switches 50, 48 is set in the "NARROW" position, a narrow band filter is selected for that channel. For the Audio A channel this is a 180 KHz filter, and for Audio B it is a 150 KHz filter. AUDIO B switch 48 should always be set to "NARROW" when data is being received. Attempting to use the wide filter for data reception will admit more noise to data demodulator 32, increasing the bit error rate dramatically. The Audio A narrow filter is needed for distortion-free reception of audio subcarriers which have a bandwidth of less than 150 KHz.

Connecting to apparatus

FIG. 1(b) shows the rear panel connectors mounted on receiver/demodulator 18.

The LNB Connection

Cable 16 connects between F-type LNB SIGNAL IN connector 52 and the LNB output of antenna 12. The LNB output signal must be in the 950 to 1450 MHz IF frequency range. Connector 52 feeds the LNB signal to RF tuner/demodulator 20, via cable 54, for tuning and demodulation. Connector 52 also conveys 20 volt DC power to the LNB, so care must be taken not to short the centre conductor of connector 52 to anything while computer 19 is on. If a short occurs, a fuse in DC-to-DC converter 83 will blow and must be replaced.

Cable 16 must be coaxial cable of the type shown in the table below for the distance between the user's LNB and computer 19:

| Maximum Cable Length | Cable Type |
| --- | --- |
| 125 feet | RG-59 |
| 250 feet | RG-8 |
| 325 feet | RG-6 |

For LNB-to-computer cable lengths exceeding 325 feet, a line amplifier such as the Norsat LA-15 amplifier available from Norsat International Inc., Surrey, B.C. Canada, is recommended.

Video and Audio Connectors

Connectors 64 and 22, 24 respectively provide a stereo audio output signal and two separate video signal outputs which may be connected to external devices such as monitor 36.

To view the video signal, video connector 22 (an RCA-type 75 ohm connector) is coupled via cable 56 to the video input terminal of monitor 36. Baseband connector 24 (also RCA-type and 75 ohms) provides a signal which is fully compatible with the Videocipher II scrambling system. Cables 58 and 60 may be used to couple this signal from connector 24 through descrambler 62 to the descrambled video input terminal of monitor 36. If the user is not employing a descrambler, then connector 24 may be ignored. If an output signal compatible with the B-MAC, Oak, or other descrambling systems is desired, the baseband circuitry of receiver/demodulator 18 must be modified. Other systems may require more complex changes.

Audio connector 64 is a miniature 3.5 mm stereo jack which provides the 600 ohm outputs from Audio A and Audio B tuner/demodulators 26, 28. In many applications, connector 64 can be connected directly, via cable 66, to an audio amplifier such as that incorporated in monitor 36.

Data Connector

Data connector 30 is a DB-9 type (female) jack which provides the RS-232C compatible signal output by data demodulator 32. The apparatus is set up as Data Communications Equipment (DCE), so pin 3 of connector 30 outputs the data, and pins 7 and 8 are ground connections. No hardware handshaking signal is provided on the other pins. The user may connect this output, via a 9-pin male to 25-pin female adapter cable 67, to a serial communications device configured as Data Terminal Equipment (DTE). Most users will likely connect the output signal supplied via connector 30 back to a 25 pin male serial connector on computer 19.

It should be recognized that, insofar as data signals received from satellite 10 are concerned, the apparatus functions as a satellite modem; by demodulating data received from the satellite and presenting same at a useful signal level to computer 19. The apparatus does not itself process the received data—that is left to the user. Note also that the format of the received data (i.e. baud rate, number of stop bits, etc.) depends solely on the transmitting (uplink) service. Thus, to obtain data from a satellite transmission, the user must know what data format the transmission employs, and configure his serial equipment for that format.

Data demodulator 32 produces usable data from an FSK-modulated sub-carrier. Demodulator 32 is connected to Audio B tuner/demodulator 28, and will produce RS-232 compatible serial data at up to 9600 baud if Audio B tuner/demodulator 28 is tuned to a compatible data channel. Data demodulator 32 is designed for compatibility with the Modulation Associates standard, but can be modified to suit the needs of a specific application.

The apparatus solves the problem of asymmetrical data bits with the aid of a level shifter (hereinafter described in greater detail) which can adjust the DC bias level of the data. The DC bias level can be set by adjusting potentiometer VR7 (FIG. 2) for optimum operation using 1200 baud data. Adjustment may be necessary when using faster or slower baud rates.

System Software

The system software allows the user to control the video frequency, audio sub-carrier frequencies, audio filter bandwidths, and video inversion parameters via computer 19. The software also facilitates screen display of data received from satellite 10, printing of the data on a parallel printer, or storage of the data in a disk file for later processing. The software further enables the user to edit, save and print configuration files containing the foregoing parameters.

The system software is menu-driven, allowing the user to easily set the system operating parameters for communication via a particular satellite channel, and save them for later communication via the same channel.

FIG. 3 depicts the main menu displayed on computer 19's monitor screen 21 when the system software is first activated. The software divides screen 21 into three windows. The largest of these is framed application window 70, within which the user exchanges information with the system software. Most application windows have their own title, shown above the window frame. For example, application window 70 depicted in FIG. 3 is titled "Main Selection" and contains several functions which the user may selectively activate as hereinafter explained. Immediately beneath application window 70, a two line message window 72 is provided, within which the system software provides information respecting the functions which may be selected from those displayed within application window 70. Along the left side of application window 70, a menu window 74 is provided, within which the software displays a brief explanation of each of the functions selectable from amongst those displayed in application window 70. Thus, the main menu displayed in FIG. 3 enables the user to select one of the four separate functions listed in menu window 74 by pressing one of computer 19's function keys [F1], [F2], [F3] or [F7] as follows:

[F1] to do "Configuration Maintenance", or
[F2] to do "Satellite Communication", or
[3] to run the "Sample Application", or
[F7] to quit the system software, and return to DOS.

When the system software is first activated, the [F1] section of menu window 74 is highlighted to inform the user that this is the function key whose action is described in application window 70. That is, the text displayed in application window 70 tells the user what he may accomplish by pressing [F1] to do "Configuration Maintenance" (hereinafter described in greater detail). The other functions displayed in menu window 74 may be selected by pressing computer 19's cursor movement keys to selectively highlight them. As each function is highlighted, the text in application window 70 changes to describe the action accomplished by selecting the highlighted function.

The system software provides a hierarchy of menus; that is, pressing [F1] at the main menu causes another menu to be displayed, from which the user can choose one of several additional functions or sub-menus. Pressing [Esc] or [F7] while the main menu is displayed returns control of computer 19 to the DOS operating system. Pressing [Esc] or [F7] at any other time returns the user to the preceding menu level.

Assume now that computer screen 21 is displaying the main menu depicted in FIG. 3, and that the user then presses function key [F1] to select "Configuration Maintenance".

The Configuration File Maintenance Menu

To provide maximum flexibility in data communications, the system software stores the communication control parameters on disk in configuration files. By creating a separate configuration file for each satellite service which is to be received, the user may quickly recall the communication parameters required to receive data from each service. Configuration files stored on disk have the file name extension ".CFG". There may be an unlimited number of configuration files.

The system software treats any file named "CURRENT.CFG" specially. When the system software initiates satellite communication, it first searches computer 19's disk storage area for a file named "CURRENT.CFG", and uses the parameters contained in that file to establish communication. Thus, the user must ensure that the file named "CURRENT.CFG" contains the correct parameters for the satellite service of interest before attempting to establish communication. This, and several related functions, may be accomplished with the aid of the Configuration File Maintenance menu.

When the user selects Configuration File Maintenance by selecting [F1] from the main menu, the system software displays the Configuration File Maintenance menu depicted in FIG. 4. Since some of the functions available to the user at this point require the name of the configuration file which is to be maintained, the system software displays a default file name "CURRENT" (i.e. "CURRENT.CFG") in the file name field after the prompt displayed within application window 70. Typically, however, the user will want to create or display configuration files for the satellite services to be received. To do this the user must edit the file name displayed in the file name field, changing it to the name of the file he wishes to work with. Before discussing the editing function, it first be useful to consider the parameters contained in the default configuration file named "CURRENT.CFG".

Configuration Parameters

Assume that computer screen 21 is displaying the Configuration File Maintenance menu depicted in FIG. 4, that the file name field contains the word "CURRENT", and that the user presses the [F2] function key to select the "Change/View Configuration" function. This causes computer 19 to display the Change Configuration menu depicted in FIG. 5, which provides a number of choices in the menu window, and indicates the various configuration parameters within the application window.

A configuration file is characterized by four types of information:

1. The name of the configuration file (the "CONFIGURATION ID") which is displayed on the top line within the application window. This is the name which appeared in the file name field when the user selected the Change/View function from the Configuration File Maintenance menu, and is the only field that cannot be edited on the Change Configuration menu.
2. Satellite receiver parameters (the fields under the "FREQUENCIES" and "SATELLITE INFORMATION" headings within the application window).
3. The serial data communication port parameters (the fields under the "PORT INFORMATION" heading within the application window).
4. Parameters dealing with data acquisition (the "RECEIVE FILE NAME" and "START/STOP CODE" fields within the application window).

Satellite Parameters

The "VIDEO/RF" frequency field allows the user to select the apparatus's Video/RF tuning frequency (in MHz). For C band channels, the tuning frequency may be calculated via the following formula:

Frequency=(20×channel number)+3700

Due to slight variations and drift of the electrical components in satellite 10, the LNB, and receiver/demodulator 18, the user may find it necessary to fine tune the video signal for best picture reception by selecting a tuning frequency up to ±7 MHz different from the published frequencies.

The "AUDIO A" and "AUDIO B" frequencies displayed within the Change Configuration Menu application window are the audio sub-carrier frequencies (in MHz) to which the apparatus will tune. If the user is accessing a satellite data service, the "AUDIO B" frequency should be set to the frequency of the sub-carrier which carries the data. As in the case of the video tuning frequencies, it may be desirable to fine tune the audio tuning frequencies by up to ±40 kHz to optimize audio signal reception.

The "LNB" frequency field allows the user to select either C Band or Ku Band reception. For C Band reception, the LNB field should be 5150 MHz (the default). For Ku Band, reception the user sets the LNB to 10750 MHz.

If the user needs to invert the polarity of the video signal (which will be the case for Ku Band reception), he need only enter the character "Y" in the "VIDEO INVERT" field; otherwise, a "N" is entered.

The user may set the bandwidth of either the "AUDIO A" or the "AUDIO B/DATA" channels to be wide or narrow by entering the characters "W" (for "wide") or "N" (for "narrow") in the "WIDE/NARROW?" fields. If the "AUDIO B" channel is used to receive data, then the "AUDIO B/DATA" bandwidth should be set to N".

Serial Port Parameters

If the user employs a serial port on computer 19 which is running the system software, then he must select the appropriate DOS logical device via the "PORT" field displayed within the Change Configuration Menu application window, and set the port parameters to match those of the satellite service to be received. The "PORT" field may define either of the Dos logical devices "COM1" or "COM2". The "BAUD" rate field may contain any valid data rate up to 9600 baud. The number of data "BITS" field may be 7 or 8. The "PARITY" field may be set to "ODD", "EVEN" or "NONE". The number of "STOP BITS" field can be set to "1" or 2".

If demodulated data is to be sent to another RS-232 compatible device, then the user must set that device's parameters to match those of the satellite service from which the data originates.

Data Acquisition Parameters

Data received from satellite 10 may be stored in a disk file. The name of this file is specified in the "RECEIVE FILE NAME" field displayed within the Change Configuration Menu application window. The file name may be changed via the Satellite Communications Menu (FIG. 6).

The user may configure the system software to automatically start and stop displaying or storing data by setting the "START CODE" and "STOP CODE" parameters. The system software monitors the data stream received from satellite 10 for four consecutive bytes of the START CODE before commencing storage of the received data in the file mentioned in the previous paragraph. Data storage stops when four consecutive bytes of the STOP CODE are detected in the data stream received from satellite 10. The default START CODE character is 002 (STX in the ASCII code set). The default STOP CODE character is 003 (ETX in the ASCII code set). The user may also manually start or stop data acquisition via the Satellite Communications Menu (FIG. 6).

Changing and Adding Configuration Files

The user may edit the data displayed in the various fields within the Change Configuration Menu application window by using the computer's keyboard cursor movement keys to select the desired field and then inserting or overwriting the fields as desired. When the desired changes have been made, the user presses one of the Function Keys listed in the Change Configuration Menu's menu window to select the desired function. The system software validates the user's input and refuses to accept fields which contain invalid data. The user must correct the data, or press [Esc] or [F7] to abandon the operation.

The user may create a new configuration file with the aid of the Configuration File Maintenance Menu (FIG. 4). He selects a name for the new file, enters it after the prompt, and presses [F1] to create the file. The system then displays the Change Configuration Menu (FIG. 5) with the default parameters shown in FIG. 5 preloaded into the various fields within the application window. The user then edits the parameters as required to adapt the configuration file for reception of signals from a particular satellite service.

If the user presses [F4] while the Change Configuration Menu is displayed, then the communications parameters displayed within the application window are stored in a computer disk file named "CURRENT.CFG" and the system immediately resets the satellite communications parameters by adopting those displayed in the application window. If the user presses [F1] while the Change Configuration Menu is displayed, then the communications parameters displayed within the application window are stored in the computer disk file having the name which the user entered after the prompt on the Configuration File Maintenance Menu. If the user presses [F7] while the Change Configuration Menu is displayed, then the communications parameters displayed within the application window are ignored and the computer screen display reverts to the Main Selection Menu (FIG. 3).

If the user presses [F3] while the Configuration File Maintenance Menu (FIG. 4) is displayed, then the configuration file named after the prompt displayed within the application window is deleted from computer 19's disk storage. If the user presses [F4] while the Configuration File Maintenance Menu is displayed, then a list of the names of all configuration files stored on computer 19's disk is displayed on monitor 21. Pressing [F4] is thus equivalent to executing the DOS command "DIR *.CFG".

If the user presses [F6] while the Configuration File Maintenance Menu is displayed, then the system prints, on computer 19's printer, the communications parameters contained within each of the configuration files stored on computer 19's disk. If the user presses [F5] while the Configuration File Maintenance Menu is displayed, then the system prints, on computer 19's printer, the communications parameters contained within the configuration file named after the prompt displayed within the application window.

The Satellite Communications Menu

The Satellite Communications Menu (FIG. 6) facilitates reception of data signals from satellite 10, and is selected by pressing the [F2] function key while the Main Selection Menu is displayed on computer 19's screen. The user is prompted to name the computer disk file in which data received from the satellite is to be stored. The default file name is the one defined in the currently active configuration file. The user then presses one of the [F2], [F3] or [F4] function keys. [F2] is pressed to indicate that data received from satellite 10 is to be stored in the file named after the prompt. [F3] is pressed to indicate that data received from satellite 10 is to be printed on computer 19's printer. [F4] is pressed to indicate that data received from satellite 10 is to be displayed on computer screen 21, within the Satellite Communications Menu application window.

When the user first presses [F2], [F3] or [F4], the system software uses the parameters stored on computer 19's disk in the CURRENT.CFG file to set the appropriate COM port and tune receiver/demodulator 18 according to those parameters. The system software then monitors the incoming data, but does not yet store or display the data. Data storage (or printing or displaying) commences when four bytes of the START CODE defined within the CURRENT.CFG configuration file are received from satellite 10; or, when the user toggles the STX Save Flag "ON" by pressing the [F5] function key while the Satellite Communications Menu is displayed on computer screen 21, to manually start the data storage (or printing or displaying) operation. Data storage (or printing or displaying) stops when four consecutive bytes of the STOP CODE defined within the CURRENT.CFG configuration file are received from satellite 10; or, when the user toggles the STX Save Flag "OFF" by pressing the [F5] function key while the Satellite Communications Menu is displayed on computer screen 21, to manually stop the data storage (or printing or displaying) operation. When no real data is being received, transmission noise may show up as random characters. If the satellite service frames its data transmission with the start and stop characters defined by the user within the CURRENT.CFG configuration file, then data acquisition will start and stop automatically, with random characters outside the framed transmission being suppressed.

To stop data reception, the user presses either [F7] or [F1] while the Satellite Communication Menu is displayed on computer screen 21, causing the screen display to revert to the Main Selection Menu.

System Software Batch Facility

The user may call up an application program from within the system software by pressing [F3] while computer 19 screen is displaying the Main Selection Menu (FIG. 3). This transfers control to a DOS batch file called "SAMPLE.BAT", and initiates execution of the DOS commands contained in that file. The user may create a SAMPLE.BAT file with any ASCII text editor. For example, if the user has a program for processing data received from satellite 10, such as a database or word processor program, he may use SAMPLE.BAT to initiate execution of that program. This facility allows the user to quickly and easily move into and out of the system software environment.

Developing Applications

A brief description will now be provided of the manner in which the user may develop his own applications software for controlling the operation of receiver/-demodulator 18, and/or processing data received from satellite 10.

It is convenient to begin with a computer programmer's overview of the apparatus.

System Registers

Computer 19 interfaces with the apparatus via four 8-bit write-only hardware registers which are used to control the various tuners and other functions. Three of the registers are used to set the video, audio A, and audio B tuning frequencies respectively. The fourth register is used for miscellaneous functions.

The satellite receiver's RF demodulator must be able to tune to any signal in the first IF frequency range (950 to 1450 MHz). It is desirable that this range be tunable in 1 MHz steps (a convenient, if not industry, standard). The number of discrete tuning frequencies is therefore: $1450-950+1=501$. Similarly, to receive any of the available audio sub-carriers, the audio tuners must have a tuning range of 5.00 MHz to 9.00 MHz, in 10 KHz steps. The number of discrete audio tuning frequencies is therefore: $(9000-5000)/10+1=401$. In both cases, an eight bit register does not provide sufficient capacity to define the complete tuning range. Thus, a ninth bit is needed to define each tuner's frequency. Three separate bits in the fourth register are used, in combination with the first three registers, to provide three separate nine bit definitions of the one video tuning frequency and of the two audio tuning frequencies. The other five bits in the fourth register control the video amplifier's polarity (invert/normal), to give the apparatus multi-band compatibility; and, also control the filter bandwidth of the audio A and audio B tuner/demodulators 26, 28 (wide/narrow). These last three functions can be overridden with hardware override switches 40, as previously described.

I/O Port Map

The four hardware registers are addressed (in hexadecimal notation) as shown in the following table:

| Port Address | Description |
| --- | --- |
| $1FC | Miscellaneous Functions Register |
| $1FD | Video Tuning Register (Bits 0 ... 7) |
| $1FE | Audio A Tuning Register (Bits 0 ... 7) |
| $1FF | Audio B Tuning Register (Bits 0 ... 7) |

The individual bits in the fourth (miscellaneous functions) register are addressed as follows (Bit 0 is the least-significant bit):

| Bit Location | Description |
| --- | --- |
| Bit 0 | Video Tuning Register (Bit 9) |
| Bit 1 | Audio A Tuning Register (Bit 9) |
| Bit 2 | Audio B Tuning Register (Bit 9) |
| Bit 3 | Audio A Wide Switch (active high) |
| Bit 4 | Audio B Wide Switch (active high) |
| Bit 5 | Video Invert Switch (active low) |
| Bits 6, 7 | Not Used |

In order for the register switch bits to work, integrated circuit U25 (FIG. 2) must be installed and hardware override switches 40 must be in their correct positions as described above; otherwise, the register will be unable to set the function to its proper state.

Programming the Video Frequency

The video frequency to which receiver/demodulator 18 tunes depends on the data stored in the Video Tuning Register and on the local oscillator ("LO") frequency of the user's low noise block downconverter ("LNB"). The LO frequency is generated by the LNB and is used to mix the RF signal arriving at antenna 12 (i.e. for C band the signal arrives at 3720 to 4180 MHz) down to the system's first IF frequency band (950 to 1450 MHz). To tune any given transponder frequency, the following procedure is adopted. First, the user subtracts the LO frequency of the LNB from the transponder frequency (the result may be a negative number). The difference so obtained is then converted to a positive number by taking its absolute value. The value 950 is then subtracted from the absolute value aforesaid, and the resultant difference is then stored in the Video Tuning Register. The LO frequency of the LNB is typically 5150 MHz for C band transponders, and 10750 Mhz for Ku band. So, for example, to tune in a 3800 MHz video signal (in the C band), the user would store ABS(5150−3800)−950=1350−950=400 ($190 in hexadecimal notation) into the Video Tuning Register. Tuner/demodulator 18 will then tune to 3800 MHz.

Programming the Audio Frequency

The audio sub-carrier frequencies to which Audio A and Audio B tuner/demodulators 26, 28 tune depend on the data stored the two audio tuning registers (Audio A and Audio B). To tune either sub-carrier to any given frequency, the following procedure is used. The frequency is first expressed in kHz. The value 5000 is then subtracted from the frequency; the difference so obtained is divided by 10; and, the resultant quotient is stored in the appropriate audio tuning register. For example, to tune the Audio B sub-carrier to a frequency of 6.80 MHz (6800 KHz), the user stores (6800−5000)/10=1800/10=180 ($B4 in hexadecimal notation) into the Audio B Tuning Register. The Audio B sub-carrier is then tuned to 6.80 MHz.

Hardware Description

The apparatus will now be described in detail, with reference to the block diagrams in FIGS. 7 through 11. Reference may also be had to the circuit schematic diagrams of FIGS. 12 and 13. The electronic circuit components comprising the various "blocks" shown in FIGS. 7 through 11 have been identified on FIGS. 12 and 13 respectively, with the same reference numerals as appear in FIGS. 7 through 11. FIGS. 12 and 13 also particularize the circuit components which make up the preferred embodiment of the invention.

Computer Connections

Receiver/demodulator 18 is connected to, and is powered by computer 19 via an IBM standard card-edge connector 29. Thus, it is imperative that computer 19 power supply satisfy the standard IBM PC power specifications. More particularly, Computer 19 power supply should satisfy the following constraints:

| Supply Voltage | Current | Voltage Tolerance |
| --- | --- | --- |
| +5 Volts | 200 mA | ±5% |
| +12 Volts | 1000 mA | ±5% |
| −12 Volts | 20 mA | ±10% |

Where the "Current" values in the table refer to the current drawn by from each supply.

Board Layout

As shown in FIG. 2, four potentiometers VR1, VR2, VR3 and VR4 are provided for adjusting the video and baseband attenuation and deemphasis. The baseband and video signal levels may be adjusted with the aid of potentiometers VR10 and VR11 respectively. Capacitors C98 and C97 respectively control the high-frequency response of the video and baseband deemphasis circuits.

Audio A Section

Audio A tuner/demodulator 26 tunes the audio A subcarrier and produces an audible audio signal. Inductor L3 adjusts the DC level of the phase locked loop ("PLL") tuner. Inductors L1 and L2 control the response of demodulator 26. Potentiometer VR5 is the mute or squelch level control adjustment. Potentiometer VR8, which sets the peak-to-peak voltage of the audio output driver, is set to one volt peak to peak for a standard 1 KHz tone, but can be adjusted if more volume is desired. However, it should be noted that adjustment of VR8 can cause distortion in the output amplifier.

Audio B Section

Audio B tuner/demodulator 28 is essentially the same as audio A tuner/demodulator 26. Inductor L7 adjusts the DC level of the PLL; inductors L8 and L9 control the demodulator response; and VR6 controls the mute level. The only difference between audio A tuner/demodulator 26 and audio B tuner/demodulator 28 is the addition of data demodulator 32 to the output of tuner/demodulator 28. This causes a slightly higher load on the B side, which that the B channel audio level adjustment potentiometer VR9 usually has to be set a little higher than the A channel audio level adjustment potentiometer VR8 to produce the same peak-to-peak output.

Data Demodulation

Data demodulator 32 employs a single control potentiometer VR7 which controls the bias level of the final comparator stage, and affects the performance (ie. the bit error rate) of the demodulator. VR7 is set for optimum performance using a 1200 baud system. For particular data applications, however, the user may have to readjust VR7 to optimize the bit error rate ("BER").

RF Tuner/Demodulator

FIG. 7 is a functional block diagram of the receiver's RF tuner/demodulator 20. The input signal is supplied via cable 54 and F-type connector 80 (FIG. 2), and is fed into image filter 82 (FIG. 7). The DC supply for the LNB (+20 volts, produced by a 12 v to 20 v DC converter 83—FIG. 2) is coupled into image filter 82's input signal by diode 84 and filtering inductor 86. This facilitates use of a single cable 16 to power the LNB and to carry the LNB's output signal to RF tuner/demodulator 20. The signal reaching RF tuner/demodulator 20's front end circuitry must be of 75 ohm impedance, and the level should be from −60 dBm to −20 dBm for coherent detection. Image filter 82 removes unwanted signals outside the first IF band and provides approximately 40 dB of rejection. The filtered signal is passed to wideband amplifier 88, which provides the gain necessary for mixing with the tuner's local oscillator ("LO") signal.

Tuning

Tuning is performed by mixing or superheterodyning the input signal with a locally synthesized oscillator signal ("LO") which is produced by an accurate phase locked loop ("PLL") oscillation system. The PLL is programmed to produce an oscillation at a specific frequency by the digital control circuitry (hereinafter described in greater detail), and ultimately, by computer 19.

In order to tune to a specific signal within the first IF band, the PLL must generate an LO which, when mixed with the input signal, will tune the signal desired in the band to a known frequency. The rest of the circuitry in the RF system can then be set to operate at that frequency. This frequency is referred to as the system's second IF frequency, which is 612 MHz. Accordingly, if the user wants to tune to a transponder which is at, say 990 MHz, then tuner/demodulator 20 must produce a signal which, when mixed with the input signal, will produce 612 MHz. Since superheterodyning is used (that is, the additive product of the mixing), an LO of 990+612 or 1602 MHz must be produced. The PLL circuitry which will now be described produces this LO.

Phase Locked Loop

The LO is generated by Voltage Controlled Oscillator ("VCO") 90 (FIG. 7), which oscillates at a frequency proportional to the DC level at its input. The output of VCO 90 feeds into one input of mixer 91 (the other input being the first IF band signal output by amplifier 88). In addition, the output of VCO 90 is buffered and sent to prescaler 92, which divides the frequency of the signal output by VCO 90 by two. This divided signal then passes through programmable divider 94, which further divides the frequency of the signal output by VCO 90 by a number depending on information provided by the digital control circuitry via serial data, clock, and strobe lines. The data on these lines is ultimately controlled by computer 19.

Reference Oscillator

In addition to programmable divider 94, the PLL circuit contains a reference oscillator 96 which is driven by crystal 98. Crystal 98 produces a 4.0 MHz signal which is divided by 512 to produce a 7.8125 KHz reference signal. This reference signal is compared, by phase comparator 100, to the divided LO signal output by programmable divider 94, and the result is fed to low pass filter 102.

Phase comparator 100 produces DC pulses which are proportional to the difference in phase (and hence frequency) between the reference signal and the divided LO signal. These pulses (which occur at roughly 7.8125 KHz intervals) are filtered by filter 102 to produce a smooth DC waveform which is in turn fed into VCO 90, which then oscillates at a given frequency depending on the DC input level.

Feed Back

Those skilled in the art will understand that when the reference signal and the divided LO signal are out of phase (or frequency) with one another, comparator 100 increases or decreases the DC signal level accordingly. This causes the output frequency of VCO 90 to increase or decrease, which in turn tends to make the divided LO signal frequency similar to the reference signal frequency. As the frequencies (and phases) of the two signals converge, the amount of the DC level shift is reduced, and this causes the frequency of the signal output by VCO 90 to more closely approximate the reference frequency, etc.

Eventually this phase locked loop arrangement causes the divided LO signal to have exactly the same phase and frequency as the reference signal output by reference oscillator 96. Since the LO signal is divided by programmable divider 94 before it is compared to the reference signal, the final "locked" frequency of the LO can be changed by simply changing the dividing ratio stored in programmable divider 94. Also, since the LO signal can be changed via programmable divider 94, and since the LO signal is mixed with the input signal to produce the second IF signal, the tuning frequency can be adjusted simply by changing the value stored in programmable divider 94. The frequency produced for a given stored value will be solely dependant on the accuracy of the reference signal, which is very accurate.

IF Circuitry

Once the desired signal is tuned to the system's second IF, it can then be filtered to remove all the other signals in the band and the mixing products. Bandpass filter 104, centred at 612 MHz, and having a bandwidth of 29 MHz, removes all signals but those falling within the band of the transponder tuned to the system's IF.

AGC Amplifier

The IF signal output by filter 104 is passed through variable gain IF amplifier 106 and then on to demodulator 108. The gain of IF amplifier 106 is adjusted with the aid of a signal created by AGC amplifier 110 utilizing the signal output by IF amplifier 106, thus creating a feedback automatic gain control ("AGC") circuit. When the output of IF amplifier 106 is very low, the AGC circuitry senses this and feeds a signal back to IF amplifier 106, causing it to increase its gain proportionately. Similarly, when the signal output by IF amplifier 106 is very high, the AGC circuitry senses this and sends a signal back to the IF amplifier 106 causing it to decrease its gain proportionately. Thus, using a feedback loop, the AGC circuitry holds the output of IF amplifier 106 within certain limits at all times.

Demodulator

Once the IF signal has been amplified and its level controlled, it is demodulated by demodulator 108 to produce a baseband signal. Demodulator 108 has a linear frequency versus voltage characteristic around the IF frequency (612 MHz). For proper demodulation, the carrier to noise level at the input should be at least 7 dB. The baseband signal level can be adjusted by with the aid of potentiometer VR10.

Video Processing Circuitry

Once the baseband signal has been produced, several useful signals may be extracted from it. Out of the total baseband signal bandwidth of approximately 9.0 MHz, the lower 4.5 MHz is devoted to video (in standard FM 2 systems) and the upper 4 MHz is devoted to subcarriers. To avoid wasting the video portion of the bandwidth, the apparatus incorporates a video conditioning circuit (FIG. 8) which converts the baseband signal into a useable video signal. Some descrambling schemes require the entire baseband signal, amplified and deemphasized, in order to function. The system provides an additional signal for this purpose.

Deemphasis Networks

The baseband signal produced by RF Tuner/Demodulator 20 (FIG. 7) first passes through two separate deemphasis circuits 112, 114 (FIG. 8). Deemphasis circuit 114 feeds the "video" path, and deemphasis circuit 112 feeds the "baseband" path (which is devoted to descramblers). Both deemphasis circuits are standard CCIR 405-1 525 line. Capacitors C97, C98 and potentiometers VR3, VR4 facilitate adjustment of the deemphasis circuits. The provision of two separate deemphasis circuits allows the baseband deemphasis to be altered or removed without affecting the video signal, which in turn facilitates compatibility with a wide variety of descramblers, some of which require that no deemphasis be present in the baseband signal output.

Video Path

After deemphasis, the signal in the video path passes through low-pass filter 116, which removes the upper portion of the signal (the portion containing the audio subcarriers). The cutoff of filter 116 is around 4.5 MHz. Filter 116 also matches the impedance of deemphasis circuit 116 to the impedance of video amplifier 118. The gain of video amplifier 118 may be varied with the aid of potentiometer VR11. The amplifier gain is set to produce 1 volt peak-to-peak output (under load) with a standard C-band signal. If a Ku-band or a non-standard signal is used, then VR11 may need to be readjusted.

Video amplifier 118 produces both inverted and non-inverted output signals, either of which may be required (in the Ku band, for example, the video signal is inverted with respect to the video signal employed in the C band). Accordingly, video polarity switch 120 is provided to switch between the inverted and non inverted outputs of video amplifier 118. A relay is used for this function; it is under the control of computer 19, but can be overridden by hardware override switches 40.

Once amplified, the signal passes through video clamp 122, which removes the dispersion (a 30 Hz signal is superimposed on many satellite feeds to provide more efficient transponder power utilization) and finally through buffer 124, thereby enabling the signal to drive a standard 75 ohm load.

Baseband Path

The baseband signal passes through deemphasis circuit 112 directly into baseband amplifier 126 (VR10 adjusts the level) which is set to produce 750 mV peak to peak. The two outputs of baseband amplifier 126 then pass into baseband polarity switch 128, which is tied to video polarity switch 120, to ensure that the signals in the video and baseband paths always have the same polarity. The signal output by baseband polarity switch 128 passes directly into buffer 130, thereby enabling the signal to drive a standard 75 ohm load.

The signal output by the baseband processing circuitry has a bandwidth of approximately 9 MHz. As configured, the baseband processing circuitry produces a signal which is fully compatible with the Videocypher II scrambling system. If the user wishes to make the signal compatible with the B-MAC, Oak, or other scrambling systems, then the baseband circuitry may have to be changed.

Audio Tuner/Demodulators

Two separate audio tuner/demodulators 26, 28 are provided. Each can be programmed directly via computer 19, and the outputs of each are available at audio output connector 64 (FIG. 2). These outputs are calibrated to produce 1 Volt peak-to-peak into a 600 ohm load. Both tuner/demodulators are completely autonomous, which enables the system to receive two different audio signals at the same time, a single direct stereo broadcast, or one audio and one data channel simultaneously.

Matching Circuit

Before the audio subcarrier can be tuned and demodulated, the unwanted portion of the baseband signal must be filtered out. As shown in FIG. 9, the baseband signal arrives from RF tuner/demodulator 20 (FIG. 7) and passes through matching circuit 132, which matches the 75 ohm impedance of the baseband RF output signal to the audio tuning circuitry's input impedance, which is typically about 60 ohms. Matching circuit 132 also acts as a high pass filter. The baseband signal bandwidth is about 9.0 MHz, only the upper 4 MHz of which contains audio subcarriers. The lower 5 MHz contains the video signal, which has no subcarriers, and can be discarded.

PLL Synthesizer/Tuner

After the unwanted portions of the baseband signal have been filtered out, a PLL synthesized tuner 133 is used to generate a local oscillator signal at a desired frequency. This signal is mixed with the baseband signal to tune the desired part of the baseband to the audio circuit's intermediate frequency ("IF"), which is 10.7 MHz. The rest of the audio circuitry (the filters and the demodulator) is tuned to this frequency.

Mixer

The signal output by matching circuit 132 has a bandwidth of about 5.0 to 9.0 MHz, and is fed into one input of mixer 134. The other input of mixer 134 is fed by buffer 136, which is connected to the tuner's local oscillator ("LO") signal. This LO signal is synthesized digitally, meaning that a programmable divider 138 is used to divide the LO signal down and compare it to a reference signal.

Local Oscillator Generation

The LO signal is generated by PLL circuit 140, which is capable of producing a signal at a precise frequency, depending on the value stored in reference divider 142. Reference divider 142's dividing rate can be programmed directly by a serial data stream. The result is a very accurate LO signal, which in turn ensures that the tuning of the entire audio section is very accurate.

The accuracy of PLL circuit 140 is determined solely by the accuracy of its reference signal, generated by 4.0 MHz quartz crystal 144, whose oscillations are divided down by reference divider 142 to produce a 10 KHz reference signal. This reference signal is compared, by phase comparator 146, to the currently produced LO signal (after it has been scaled down by programmable divider 138) and this result is fed into low pass filter 148. Phase comparator 146 produces a DC pulse which is proportional to the phase difference between the reference and the scaled LO signals. When the LO signal leads the reference signal in phase, phase comparator 146 produces a negative going pulse. When the LO signal lags the reference signal in phase, phase comparator 146 produces a positive going pulse. When the LO and reference signals are in phase, the output of phase comparator 146 is high impedance.

Varactor Tank Circuit

The pulses produced by phase comparator 146 are filtered and integrated by an active low-pass filter circuit 148, producing a DC signal at the output of filter 148. Because of the pulsing action of phase comparator 146, the output of filter 148 is a DC bias level proportional to the change in phase between the LO and reference signals. This DC bias feeds varactor tank circuit 150, which oscillates at a known frequency, depending on the level of the DC signal produced by low pass filter 148. The value of DC bias needed to produce a given oscillation frequency can be adjusted via inductor L3 (FIG. 2—L7 for the audio B circuit). Adjusting these inductors (and hence changing their inductance), changes one of the values in varactor tank circuit 150 and hence changes the tank circuit's oscillation frequency. The resultant oscillation is fed into VCO 152 and buffer 136, to produce the LO signal.

Feed Back

The LO signal passes to the input of mixer 134. In addition, the LO signal is buffered and fed back into programmable divider 138, which divides it by the programmed divisor value. The value is set by three serial lines (labelled CLOCK, DATA and STROBE on FIG. 9) which are controlled by the digital control circuitry. Once the LO signal is divided down, it is compared to the reference, and this influences the DC bias of varactor tank circuit 150, which controls the LO, etc., creating a feed-back system.

Programming the PLL

Since reference divider 142 is set to produce a 10 KHz signal, programmable divider 138 must also be set to produce a 10 KHz signal from whatever LO frequency is desired. For example, if a 16.2 MHz LO signal is required, the digital control circuitry must store the value 1620 (i.e. 16.2 MHz divided by 10 KHz) in programmable divider 138. This means that PLL circuit 140 locks at a frequency of 10 KHz multiplied by the value stored in programmable divider 138. To determine the LO frequency required to tune a given subcarrier frequency, one must recognize that mixer 134 uses high-side (superheterodyne) conversion. This means that in order to tune a subcarrier at 6.2 MHz, the LO must be 10.7+6.2 MHz=16.9 MHz, and thus the value 1690 must be stored in programmable divider 138. In this way the tuner can create any LO frequency required (within the range of 15.7 to 19.3 MHz, in 10 KHz steps) and mix it with the baseband signal, thus allowing any subcarrier to be tuned to the audio section's IF frequency.

Filter Section

Two audio filters are provided per channel to allow the system to demodulate a wide variety of audio subcarriers with little or no distortion and a minimum of noise. The first filter 154 is hard wired into the circuit, and has a bandwidth of 280 KHz centred around 10.7 MHz. The second filter 156 is connected to a resistor-diode switching network 158, which facilitates switching of filter 156 into and out of the circuit (under the command of the digital control circuitry and, ultimately, computer 19). When filter 156 is switched into the circuit, the circuit outputs a narrow band audio signal. When filter 156 is switched out of the circuit, the circuit outputs a wide band audio signal. Filter 156 always has a bandwidth of 180 KHz (centred around 10.7 MHz) for the audio A channel, but can and does vary in the audio B channel, depending on the application in which it is used. The audio B channel is also connected to data demodulator 32, and is equipped with a 150 KHz filter for the narrow band function. Different data modulation schemes require different signal bandwidths, however, and this filter could be changed to accommodate a particular modulation scheme.

In use, the wide band audio filter produces much more ambient noise than the narrow band filter. The narrow band filter, on the other hand, tends to clip the peaks of the audio signal (and hence cause distortion) on subcarriers which have a bandwidth which is too wide. A good way to choose between the narrow and wide filters for a given subcarrier is to try the narrow filter first, tune for minimal distortion, then try the wide filter. If the audio signal is distorted with the narrow filter, then the wide filter should be used. On the other hand, if the audio signal contains a large amount of noise then the narrow filter should be used.

Audio Demodulator

The filtered FM signal output by switching network 158 is fed into demodulator 160, which performs the frequency to voltage conversion. Two tuning inductors L1, L2 (for the audio A channel; L8, L9 for the audio B channel) form a discriminator, which determines the response and centre frequency of demodulator 160. When properly tuned, demodulator 160 should have a linear frequency response at 10.7 MHz in a bandwidth of at least 600 KHz.

Demodulator 160 also amplifies the signal to a level of about 500 mV. This output can be interrupted (muted) by internal circuitry if a carrier of acceptable level is not detected or locked onto by the demodulator. This is the mute or squelch function. Mute control potentiometer VR5 (for the audio A channel; VR6 for the audio B channel) sets the level at which the internal squelch circuit is activated (if set improperly, the audio signal will stay muted, even if there is a carrier present).

Audio Deemphasis and Amplification

The audio component of a satellite signal is usually preemphasized at the transmission point. The amount of preemphasis is the same as used in conventional FM radio transmissions (75 microseconds). This preemphasis is removed from the signal after demodulation, using a simple RC deemphasis circuit 162.

Once deemphasized, the audio signal passes through amplifier 164, which enables the signal to drive a standard 600 ohm load. In the audio B channel, the signal output by deemphasis circuit 162 also passes to data demodulator 32. Potentiometer VR8 (for the audio A channel; VR9 for the audio B channel) adjusts the output voltage of amplifier 164, thereby facilitating volume control. It is recommended that the output not be set to more than 1 volt peak-to-peak for a standard 1 KHz tone, or the low frequency response of the output may be degraded. The amplified audio signals output by audio tuner demodulators 26, 28 are available at connector 64 (FIG. 2), which is a 3.5 mm miniature stereo jack.

Data Demodulator

Data demodulator 32 (FIG. 1(a)) facilitates production of useable data from FSK modulated subcarriers. Data demodulator 32 is connected to the Audio B circuitry and will produce RS-232 compatible serial data at up to 9600 baud when the Audio B circuitry is tuned to a compatible data channel.

FIG. 10 is a block diagram of data demodulator 32. The tuned, demodulated audio signal produced by the audio B circuitry is tapped off deemphasis circuit 162 as described above and fed into the input of the data demodulator. The data demodulator amplifies, digitizes and filters this input, and the result is an RS-232 compatible data signal available to external devices at connector 30 (FIG. 2).

Initial Amplification

The raw audio signals output by deemphasis circuit 162 first pass through an amplifier/low pass filter 166 (it is this filter which sets the upper and lower limits of the usable baud rate) which amplifies the signal and removes the effects of high frequency noise on the data. The signal is then amplified by amplifier 168, which adds a small amount of hysteresis to shore up the transition times of the data bits. The signal output by amplifier 168 has a very high peak to peak voltage swing, and is not yet at digital levels. Moreover, the addition of hysteresis means that the pulse widths of the bits may not be of equal (or correct) duty cycle.

Level Shifting

The problem of asymmetrical data bits is solved by level shifter 170, which adjusts the DC bias of the data. The level of the DC bias can be set by adjusting potentiometer VR7, which is set for optimum operation using 1200 baud data. Adjustment may be necessary when using faster or slower baud rates.

Once the DC bias of the amplified data has been set, the data bits are passed through comparator 172, which also has some hysteresis, and which produces data bits of equal duty cycle.

Output Buffer

The valid data bits must be buffered to produce RS-232 compatible voltage and current levels. A transistor buffer 174 is used to increase the voltage swing of the data (to −8 volts for "0" logic levels and to +8 volts for "1" logic levels) so that it can drive an RS-232 compatible serial interface. Buffer 174 is capable of driving a 1000 ohm load.

Digital Control Circuitry

The digital control circuitry now described with reference to FIG. 11 provides the system with all of its control, tuning data and timing signals. In addition, an external source such as computer 19 may be interfaced directly with part of this circuitry, enabling computer 19 to provide tuning information via its data and address buses 192, 196.

Tuning ROM

An "addressable storage means", namely EPROM 176 stores all of the tuning information for the system. Computer 19 enters data into the hardware registers, as previously described, to cause these registers to point to a group of storage locations in EPROM 176 which holds the tuning data. The format required for the tuning data is very complex, so it is much easier to store the data in a table to which computer 19 need only point, rather than rely on computer 19 to input the complex tuning information directly. Since the PLL tuning data is stored in EPROM 176, this ensures that no errors can occur in tuning the system. In other words, whatever data is stored into the hardware registers by computer 19 will point to a valid set of data in EPROM 176 (it may not be the correct frequency desired, but at least the data going to the tuners will not be in the wrong format).

If a different set of tuning criteria are desired (such as reducing the tuning range, or having smaller tuning steps) a new EPROM must be created and fitted into the appropriate socket. For example, one could create an EPROM containing the same tuning data in all storage locations. No matter what information computer 19 sent to the hardware registers, the apparatus would always tune to the same frequency. This is very handy for testing and for applications in which it is critical that the system remain tuned to the same channel at all times, irregardless of the state of computer 19.

System Clock

The system clock signal is generated by an RC network 178, running at 28 KHz, which drives a 14-bit ripple counter 180. Counter 180 divides the clock frequency down and transmits the resultant clock signal to control logic 182. Thus, counter 180 generates the main "heartbeat" of the system, independent of the actions of computer 19. The clock signal also drives EPROM 176, so that it outputs its data in sequence with control logic 182. The net result is that when control logic 182 is clocking the video tuner, EPROM 176 is outputting the video tuning data; when control logic 182 is clocking the audio A tuner, EPROM 176 outputs audio A tuning data; etc.

Control Logic

Control logic 182 interprets the outputs of counter 180 and produces signals to control the Clock and Strobe lines going to the various tuners. It is important that control logic 182 provide the correct signals at the correct time. Each of the three tuning sections is addressed in sequence; first the Video (RF) tuner, followed by a pause, followed by the Audio A tuner, followed by the Audio B tuner. Once this sequence is complete, the cycle starts over again with the Video tuner. In this way, the control circuitry continuously clocks and strobes each of the tuners.

Control logic 182 also provides the clock signals for shift register 184, which shifts the data out of EPROM 176. The tuners require serial data, so EPROM 176's 8 bit words must be shifted out serially. This data shifting is carried out in sequence with the Clock and Strobe lines to the various tuners; so that when the Clock and Strobe lines going to the Video tuner are active, the data being shifted out of EPROM 176 is the video tuning data, etc.

Computer Data Latches

Control logic 182 also sends control signals to the aforementioned hardware registers; namely, latches 186, 188 and 190, which contain the data sent by computer 19 via its data bus 192. As previously described, latches 186, 188 and 189 provide the vector address pointers to desired groups of tuning data stored within EPROM 176. Each of the three tuning latches is strobed in sequence, and when strobed, sends its contents to the address lines of EPROM 176. This means that EPROM 176 outputs the contents of whatever table entry is stored at the address pointed to by each latch, as each latch is strobed. After each latch is strobed, EPROM 176 outputs several data bytes which are fed into shift register 184. Thus, control logic 182 must also strobe the latch corresponding to the tuner which is currently active.

The data in the latches, which is supplied by computer 19, controls the address of the data being shifted out of shift register 184. Since the tuning data is multibyte in nature, control logic 182 must keep the latch enabled for each byte that is being shifted out of EPROM 176.

The control circuitry can only provide the correct signals to enable the outputs of the latches. The latch write lines are not under the control of system. These lines connect, through decoding logic 194, which serves as a "data receptor means", for receiving data from computer 19's address bus 196. The latches are mapped into computer 19's memory at hexadecimal locations 1FC-1FF and are write only.

Tuning Data

EPROM 176 is organized in such a way that each latch value points to 8 bytes (thus one table entry is 8 bytes long). These 8 bytes are further broken down by control logic 182 into two 4-byte words. This is essential, since the audio tuning circuitry requires two separate 24-bit words for each frequency to be tuned. Only one 16-bit word is needed to tune the video tuner, but the need for symmetry in digital logic requires that the extra bytes be allocated, even though they are not used.

The strobe portion of control logic 182 provides a pulse when each of the two words for every table entry has been completely shifted out of EPROM 176 into shift register 184. For the video signal tuning, this means that a strobe pulse is generated after the first 16 bits; and, for the audio signal tuning, this means a strobe pulse is generated after the first 24 bits. (Bits 17-32 in the video table entry are not used, and bits 25-32 of the audio table entry are not used).

Miscellaneous Control Functions

In addition to the tuning data, the digital control circuitry provides information to the system on the filter bandwidths, and the polarity of the video signal. Latch 198 stores the status of these functions, which can all be programmed via computer 19, or overridden by means of hardware override switches 40 (FIG. 2). FIG. 11 illustrates the function of hardware override switches 40. Audio A and B wide/narrow controllers 200, 202 regulate the bandwidth of the filters used in the audio tuners. For data reception, for instance, the filter used by the audio channel B must be set to "narrow". Video invert controller 204 regulates the video signal polarity (for Ku band reception, for example, this should be set to "invert").

Software Interface

All system functions can be programmed directly via computer 19. Accordingly, complex software-based control algorithms can be developed to configure the system according to the requirements of a specific application. Moreover, with the aid of data demodulator 32, and a suitable coupling means (i.e. serial data cable and interface) for coupling data signals output by data demodulator 32 back into computer 19, the computer can directly reconfigure some or all of the tuning parameters in accordance with data received from satellite 10, without the need for operator intervention. In other words, a selected receiver or group of receivers can be addressed, tuned, and sent information, all under the control of a remote, ground based satellite "uplink" site 11.

Memory Map

The hardware registers (i.e. latches 186, 188, 190 and 198) which control the receiver tuning parameters are mapped directly to computer 19's data bus 192. Accordingly, by simply writing tuning data to an output port, a computer program may tune the receiver. The base address of the registers is binary 01 1111 11A1A0 (hexadecimal $1FC). A1 and A0 are the two address lines used to select the register which is to receive the tuning data. Thus, register 0 (latch 198) is addressed at I/O location $1FC, register 1 (latch 186) at $1FD, etc. Due to the inherent nature of the IBM PC's I/O device addressing scheme, only the first 10 address lines (address lines A0 to A9) can be used to address an I/O device. The other lines (addresses A10 to A19) are ignored during I/O device operations.

Bit Map

Each of the four latches may be addressed using the following table:

| Bits A1, A0 | Description |
| --- | --- |
| 00 | Miscellaneous Functions |
| 01 | Video Tuning Address |
| 10 | Audio A Tuning Address |
| 11 | Audio B Tuning Address |

Video Tuning

The 9 bit video tuning address (8 bits of which are obtained from video tuning register 186; the 9th bit obtained from bit 0 of miscellaneous functions register 198) constitutes an offset pointer to a four byte storage location within EPROM 176 containing the four bytes needed by the RF PLL synthesizer to tune to a specific video frequency. These four bytes are shifted out of EPROM 176 in serial fashion by control logic 182 and, along with the corresponding clock and strobe lines, are fed to RF PLL programmable divider 94 (FIG. 7). The video tuning frequency defined by the storage offset pointer (i.e. "address") of a particular four byte group stored within EPROM 176 (in MHz) may be calculated using the formula:

$$\text{video tuning freq.} = \text{LNB LO freq.} \pm (\text{address} + 950)$$

where "LNB LO freq." is the frequency of the local oscillator signal generated by the LNB and mixed with signals received in a particular band (ie. for C-band the signal arrives at 3720 to 4180 MHz) to produce the system's standard first IF frequency band (950 to 1450 MHz). For example, to tune in C-band transponders, take the frequency of the transponder to be tuned and subtract the LO frequency of the LNB (in this case, 5150MHz); take the absolute value of the resultant difference; and then subtract 950 to obtain the address to be stored in register 186 (with a 9th bit to be stored in bit 0 of register 198). To tune 3800 MHz in the C-band, one would store ABS (5150−3800)=1350−950=400 (i.e. 1 1001 0000 in binary, or $190 in hexadecimal) in the registers.

Audio Tuning

The Audio tuning function is similar to the video tuning function, in that a specific tuning frequency (expressed in KHz) can be directly correlated to a storage address within EPROM 176 by means of a simple formula. In this case the formula is:

$$\text{audio tuning freq.} = 5000 + \text{address} * 10$$

For example, to tune to 6.80 MHz, multiply by 1000 (to convert to KHz) then subtract 5000, to obtain 1800. Then divide by 10, to obtain 180 (i.e. 0 1011 0100 in binary, or $1B4 in hexadecimal), which is the correct address for the frequency in question. Hence, writing eight bits of the data $1B4 into either of audio latches 188 or 190, with the ninth bit being written into either of bits 1 or 2 of miscellaneous functions register 198, depending on whether the A or B channel is to be tuned, causes the audio circuitry to tune to 6.80 MHz.

Miscellaneous Functions Register

Miscellaneous functions register 198 contains the 9th bit of tuning data required (together with the eight bits stored in any of registers 186, 188 or 190) to complete the EPROM storage offset pointer addresses; and, the filter and video switch bits. The bit map of register 198 is:

| Bit Location | Description |
|---|---|
| Bit 0 | Video Address Bit 9 |
| Bit 1 | Audio A Address Bit 9 |
| Bit 2 | Audio B Address Bit 9 |
| Bit 3 | Audio A Wide Switch (active high) |
| Bit 4 | Audio B Wide Switch (active high) |
| Bit 5 | Video Invert Switch (active low) |
| Bits 6 + 7 | Not Used |

In order for the switch bits to work, integrated circuit U25 (FIG. 2) must be installed and hardware override switches 40 must be set, as previously described, to the correct positions for computer control. If this is not done correctly, register 198 will be unable to control the various functions.

Hardware Specifications

The satellite receiver/demodulator of the preferred embodiment conforms to the following specifications:

| Receiver | |
|---|---|
| Input Frequency: | 950 to 1450 MHz |
| Input Level: | −65 to −25 dBm |
| Input Impedance: | 75 ohms |
| Input VSWR: | 3.0 Max |
| Noise Figure: | 12 dB Max |
| Threshold: | Less than 7 dB C/N static |
| IF Frequency: | 612 MHz |
| IF Bandwidth: | 27 MHz @ 1 dB |
| | 29 MHz @ 3 dB |
| Local Osc. Radiation: | Less than −55 dBm |
| Video | |
| De-emphasis: | CCIR 405-1, 525 lines |
| Frequency Response: | 20 Hz to 4.2 MHz (±1 dB) |
| Dispersion Removal: | Greater than 40 dB |
| Output Level: | 1 Vp-p |
| Output Impedance: | 75 ohms Unbalanced |
| Output Return Loss: | 14 dB Min |
| Output Polarity: | Switchable |
| Differential Gain: | 5% Max |
| Differential Phase: | 5 deg Max |
| Tuning: | Synthesized in 1 MHz steps |
| Audio | |
| Subcarrier Freq. Range: | 5.0 to 8.5 MHz in 10 KHz steps |
| Channel Bandwidth: | Selectable 280 KHz or 180 KHz (Aud A) & 150 KHz (Aud B) @ 3 dB |
| Frequency Response: | 30 Hz to 15 KHz (±2 dB) |
| De-emphasis: | 75 us |
| Output Level: | 0 dBm |
| Output Impedance: | 600 ohms Unbalanced |
| Harmonic Distortion: | Less than 2% |
| S/N: | 50 dB Min |
| Modes: | Mono/Direct Stereo |
| Data | |
| Subcarrier Freq. Range: | 5.0 to 8.5 MHz in 10 KHz steps |
| Channel Bandwidth: | Selectable 280 @ 3 dB or 150 KHz @ 3 dB |
| Data Format: | FSK (300 to 9,600 baud) |
| Error Rate: | $1 \times 10(-7)$ |
| Unclamped Baseband | |
| Frequency Response: | 10 KHz to 8.5 MHz (±1 dB) |
| Output Level: | 750 mV Adjustable |
| Output Impedance: | 75 ohms Unbalanced |
| Power Supply | |
| 12 V ± 5% @ .8 A | |
| 5 V ± 5% @ .3 A | |
| −12 V ± 10% @ 50 mA | |
| I/O Terminals | |
| LNB: | Type F: +20 VDC, 200 mA |
| Video Out: | RCA Phono |
| Baseband Out: | RCA Phono |
| Audio Out: | Mini Phono |
| Computer Interface: | Card Edge Connector |
| Data: | DE-9S 9 pin Sub D (female) |

Source Code Listing

Appendix "A" submitted herewith is a 139 page software source code listing of the computer program which controls the operation of the preferred embodiment of the invention. The program is written in the "C" programming language. It is believed that the listing and the descriptive comments embedded therein will suffice to enable those skilled in the art to understand the operation of the software.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:

1. Apparatus for receiving and demodulating a satellite broadcast signal, comprising:
   (a) programmable radio frequency tuner/demodulator means for demodulating said broadcast signal to produce a baseband output signal;
   (b) addressable storage means for storing tuning data representative of one or more tuning frequencies;
   (c) data receptor means for receiving address data from an external source;
   (d) control means for:
      (i) coupling to said data receptor means and decoding said address data to produce an address of a corresponding storage location within said storage means;

(ii) extracting said tuning data from said corresponding storage location; and, (iii) programming said radio frequency tuner/demodulator means with said tuning data; and, (e) video demodulator means for demodulating said baseband output signal to produce a video output signal, said video demodulator means comprising:

(i) first deemphasis means for deemphasizing said baseband output signal;

(ii) low pass filter means for low pass filtering said deemphasized baseband output signal;

(iii) first amplifier means for amplifying said filtered, deemphasized baseband output signal;

(iv) first polarity switching means for controllably switching the polarity of said amplified, filtered, deemphasized baseband output signal; and, (v) clamping means for removing dispersion from said amplified, filtered, deemphasized baseband output signal.

2. Apparatus as defined in claim 1, wherein said video demodulator means is further for demodulating said baseband output signal to produce an unclamped, unfiltered baseband output signal, and further comprises:

(a) second deemphasis means for deemphasizing said baseband output signal;

(b) second amplifier means for amplifying the deemphasized baseband signal output by said second deemphasis means; and, (c) second polarity switching means, coupled to said first polarity switching means, for controllably switching the polarity of the amplified, deemphasized baseband signal output by said second amplifier means to produce said unclamped, unfiltered, baseband output signal.

3. Apparatus as defined in claim 1, wherein said video demodulator means is further for demodulating said baseband output signal to produce an unclamped, unfiltered baseband output signal, and further comprises:

(a) second deemphasis means for deemphasizing said baseband output signal;

(b) second amplifier means for amplifying the deemphasized baseband signal output by said second deemphasis means; and, (c) second polarity switching means, coupled to said first polarity switching means, for controllably switching the polarity of the amplified, deemphasized baseband signal output by said second amplifier means to produce said unclamped, unfiltered, baseband output signal;

and wherein said control means is further for:

(d) receiving polarity switching data from said external source; and, (e) transmitting said polarity switching data to said first and second polarity switching means, thereby causing the polarity of said video output signal and the polarity of said unclamped, unfiltered, baseband output signal to adopt a state represented by said polarity switching data.

4. Apparatus for receiving and demodulating a satellite broadcast signal, comprising:

(a) programmable radio frequency tuner/demodulator means for demodulating said broadcast signal to produce a baseband output signal;

(b) addressable storage means for storing tuning data representative of one or more tuning frequencies;

(c) data receptor means for receiving address data from an external source;

(d) control means for:

(i) coupling to said data receptor means and decoding said address data to produce an address of a corresponding storage location within said storage means containing first audio tuning data for tuning said first frequency audio tuner/demodulator means;

(ii) extracting said first audio tuning data from said corresponding storage location;

(iii) programming said first audio frequency tuner/demodulator means with said first audio tuning data; and, (e) first programmable audio frequency tuner/demodulator means for demodulating said baseband output signal to produce a first audio output signal, said first programmable audio frequency tuner/demodulator means further comprising:

(i) first voltage controlled oscillator means for producing a first local oscillator output signal having a frequency determined by an input reference signal;

(ii) first reference oscillator means for producing a first fixed frequency reference output signal;

(iii) first programmable divider means for receiving said first audio tuning data and for dividing said first local oscillator output signal by an amount determined by said first audio tuning data;

(iv) first programmable reference divider means for receiving said first audio tuning data and for dividing said first fixed reference frequency output signal by an amount determined by said first audio tuning data;

(v) first comparator means for comparing the frequency of signals output by said first programmable divider means with the frequency of signals output by said first programmable reference divider means and for producing an output signal representative of the difference between said signal frequencies, said difference comprising said first voltage controlled oscillator input reference signal;

(vi) signal mixing means for mixing said baseband output signal with said local oscillator output signal to produce an intermediate frequency output signal;

(vii) first bandpass filter means for bandpass filtering said intermediate frequency output signal to produce a filtered intermediate frequency output signal;

(viii) first switchable bandpass filter means for bandpass filtering said intermediate frequency output signal within a narrow frequency pass band to produce a narrowly filtered intermediate frequency output signal;

(ix) second switchable bandpass filter means for bandpass filtering said intermediate frequency output signal within a wide frequency pass band to produce a widely filtered intermediate frequency output signal; and, (x) filter switching means for controllably actuating one or the other of said first and second switchable bandpass filter means.

5. Apparatus as defined in claim 4, wherein said control means is further for:

(a) receiving filter switching data from said external source; and, (b) transmitting said filter switching data to said filter switching means, thereby actuating one or the other of said first and second switchable bandpass filters.

6. Apparatus for receiving and demodulating a satellite broadcast signal, comprising:
 (a) programmable radio frequency tuner/demodulator means for demodulating said broadcast signal to produce a baseband output signal;
 (b) addressable storage means for storing tuning data representative of one or more tuning frequencies;
 (c) data receptor means for receiving address data from an external source;
 (d) control means for:
  (i) coupling to said data receptor means and decoding said address data to produce an address of a corresponding storage location within said storage means;
  (ii) extracting said tuning data from said corresponding storage location; and,
  (iii) programming said radio frequency tuner/demodulator means with said tuning data;
 (e) first programmable audio frequency tuner/demodulator means for demodulating said baseband output signal to produce a first audio output signal;
 (f) second programmable audio frequency tuner/demodulator means for demodulating said baseband output signal to produce a second audio output signal;
 (g) data demodulator means for demodulating said second audio output signal to produce a data output signal said data demodulator means further comprising:
  (i) first amplifier means for amplifying said second audio output signal to produce an amplified replica thereof;
  (ii) voltage level shifting means for shifting the voltage level of said amplified replica signal; and,
  (iii) comparator means for comparing the width of signal pulses output by said voltage level shifting means with a reference pulse width and for adjusting the width of said signal pulses to equal said reference pulse width.

* * * * *